(12) United States Patent
Arnold

(10) Patent No.: US 8,511,265 B2
(45) Date of Patent: Aug. 20, 2013

(54) VARIABLE STROKE AND COMPRESSION RATIO ENGINE

(76) Inventor: Steven Don Arnold, Rancho Palos Verdes, CA (US)

( * ) Notice: Subject to any disclaimer, the term of this patent is extended or adjusted under 35 U.S.C. 154(b) by 495 days.

(21) Appl. No.: 12/790,848

(22) Filed: May 30, 2010

(65) Prior Publication Data
US 2010/0300410 A1    Dec. 2, 2010

Related U.S. Application Data

(60) Provisional application No. 61/183,015, filed on Jun. 1, 2009.

(51) Int. Cl.
*F02B 75/04*    (2006.01)
(52) U.S. Cl.
USPC .................................. 123/48 B; 123/56.1

(58) Field of Classification Search
USPC .............. 123/48 R, 48 B, 78 R, 78 B, 78 BA, 123/56.1–56.8
See application file for complete search history.

(56) References Cited

U.S. PATENT DOCUMENTS

| | | | |
|---|---|---|---|
| 1,968,470 A * | 7/1934 | Szombathy | 123/56.4 |
| 2,532,254 A * | 11/1950 | Bouchard | 123/56.4 |
| 2,539,880 A * | 1/1951 | Wildhaber | 123/56.4 |
| 4,433,596 A * | 2/1984 | Scalzo | 123/56.3 |

* cited by examiner

*Primary Examiner* — Noah Kamen
(74) *Attorney, Agent, or Firm* — Felix L. Fischer

(57) ABSTRACT

A variable stroke and compression ratio engine employs multiple pistons connected to a wobbler. A crank with an axis of rotation has an upper journal with a first angle relative to the axis and a lower journal with a second angle with respect to the axis. A cradle connected for rotational motion with respect to the wobbler is carried by the crank with sliding engagement to the upper and lower journals for translation between a first high eccentricity position and second low eccentricity position.

19 Claims, 25 Drawing Sheets

VARIABLE STROKE AND COMPRESSION RATIO ENGINE

REFERENCE TO RELATED APPLICATIONS

This application relies on the priority of provisional application Ser. No. 61183015 filed on Jun. 1, 2009 entitled Variable Stroke Constant Compression Ratio Engine having a common inventor with the present application.

BACKGROUND OF THE INVENTION

1. Field of the Invention

This invention relates generally to the field of internal combustion engines and more particularly to a multicylinder internal combustion engine having a wobbler connected to the pistons and positionable on a dual angled crank for variation of the stroke while maintaining constant compression ratio.

2. Description of the Related Art

The internal combustion engine in its two current forms (spark ignited gasoline and compression ignition diesel) is poorly suited to efficiently power personal transportation. Automobiles and customer's expectations have evolved such that the engine's maximum power is far beyond what is normally used and the engine operates at 5-25% load most of its life.

The diesel engine is more efficient at part load than the gasoline engine; however the 2000+ bar fuel injection system, variable geometry turbocharger(s) system, and emissions after-treatment have made the modern passenger vehicle diesel engine quite expensive. High levels of EGR to reduce NOX, SCR catalysts, and diesel particulate filters all negatively impact the engine efficiency. In addition, the price of diesel fuel relative to gasoline often negates any cost savings from the inherent higher efficiency of the engine for the end user.

The gasoline engine is still relatively inexpensive, and due to the 3 way catalyst, it is a very clean engine and full load efficiency can reach 35%. Unfortunately, the part load performance is extremely poor, with thermal efficiency dipping into single digits during much of its operation and seldom reaching 20% or higher. An idling gasoline engine with the vehicle running its air conditioning, power steering, and entertainment system has significant energy losses from throttling, engine friction accessory parasitic losses and cooling losses and uses fuel at a very high rate.

FIG. 1 shows the basic Pressure/Volume (PV) diagram for a gasoline engine. Power is controlled by throttling the air system. The engine runs at a nearly constant air/fuel ratio, therefore the engine's air system must be restricted to reduce the fuel flow and thus the power. At low load operation, the intake manifold of the engine is reduced to a very low pressure, while the exhaust manifold remains above atmospheric (plus muffler, catalyst, and pipe restrictions). This results in a severe pumping loss. The difference in pressure from the engine's intake to exhaust due to throttling is a direct loss in Brake Mean Effective Pressure (BMEP) and is commonly referred to as "negative pumping loop work" as shown in FIG. 2.

Perhaps an even larger impact than the direct pumping work, the engine system's Compression Ratio (CR) and Expansion Ratio (ER) are reduced. Thermodynamic cycles (such as the Otto cycle) are often used to characterize various engine types, however these cycles are different than the actual engine mechanical cycle that is seen on a PV diagram. The fact that a PV diagram of the actual engine cycle looks similar to the thermodynamic cycle adds to the confusion. In the thermodynamic cycle, the compression ratio and expansion ratio are characterized on the X-axis, i.e. Volume Ratio. This does not account for the induction and exhaust processes. If it did, then those processes would have to happen instantaneously at top dead center and bottom dead center with no pressure drop and the connecting reservoir would have to be at the same pressure and temperature, i.e. no throttling on the inlet or back pressure on the exhaust.

The theoretical volume ratio of an engine is not indicative of real efficiency when intake valves and exhaust valves open at various times during the compression and expansion processes, and an engine can throttled down to 0.1 bar in the intake manifold while the exhaust manifold is greater than 1 bar. The limitations of using thermodynamic cycles to draw conclusions about real engines are particularly severe when considering part load operation of a throttled gasoline engine.

In the real engine, power is produced by the expansion of the hot gas; the compression of the cold air is a necessary parasitic loss. These powers, one positive and one negative, are a function of the compression ratio and expansion ratio as calculated on the Y-axis (Pressure Ratio).

In a closed thermodynamic cycle, there is a fixed relationship between P and V, i.e. PV=mRT. In an open cycle engine with valves, this relationship does not exist, therefore the thermodynamic cycles are not really simplified representations of real operating cycles.

The efficiency of the simplified thermodynamic cycle that represents this engine, the Otto cycle, is a function of compression ratio $$\eta = 1 - 1/CR^{(\gamma-1)} \text{ where}$$

η engine efficiency
CR compression ratio
γ ratio of specific heats of air

Looking at a highly throttled operating point as shown in FIG. 2, the volume compression in the cylinder is the same ratio, but since the intake manifold pressure is very low, the absolute pressure of the gas that is compressed is much lower. The power of the engine is obtained by the expansion stroke. If the outlet pressure of the expansion stroke remains fixed at slightly above atmospheric, then the lower pressure from compression will result in a lower expansion ratio. This reduces the power and efficiency of the engine. As an example, if a 10/1 compression ratio engine is throttled from 1 Bar to 0.5 Bar in the intake manifold, the true CR to put into the efficiency calculation is a CR of 5/1. While there may be some academic debate that the compression ratio is determined by the displacement of the engine and the minimum combustion volume rather than the pressures at the beginning and end of compression, there is no debate that the expansion ratio of the engine will be less when it is throttled, which is clearly shown in FIG. 2. Therefore, the engine power is reduced not just from the reduction of air mass flow (and thus fuel flow), but from having a lower expansion ratio. The reduction of mass flow through the engine reduces the power—the reduction of the expansion ratio lowers the power and the thermal efficiency.

The engine friction comes from a great number of components; rings, pistons, rod bearings, crankshaft bearings, and the valve train (cam bearings, tappets, valves, and gears or chain). The oil pump parasitic loss can be book kept here as well. As known in the art, the rings and pistons account for about ½ of the friction loss as shown in FIG. 3 (TMechE Review on Tribology. "Tribology—Motoring into the 21$^{st}$ Century" by Chris Taylor, 2003). The friction of the engine is mainly a function of the engine speed and not of load. The Shinn-Flynn friction model for IC engines shows this as does FIG. 4 (Internal Combustion Engine Handbook, Edited by Basshuysen & Shafer, 2004 SAE International):

$$FMEP = a + (b*P_{cyl}) + (c*v^2)$$

where,

FMEP Friction Mean Effective Pressure a constant part of friction (0.3-0.5 bar)

b coefficient for contribution due to cylinder maximum pressure (0.004-0.006)

$P_{cyl}$ peak cylinder pressure (bar)

c coefficient for contribution due to piston (0.0006-0.0012)

v mean piston speed (m/sec).

Thus an engine at 2000 rpm accelerating at full load has essentially the same friction loss as an engine at 2000 rpm at 10% load (cruising at moderate speed). If the output of the engine is 40 kW and the friction loss is 2 kW, then it's a 5% effect. If the output of the engine is at 4 kW, and the friction loss is still 2 kW, then it's a 50% effect. This fact shows why cylinder deactivation schemes bring only marginal benefit. The pistons, rings, crank, and valve train are still contributing very nearly the same parasitic loss as they would be if all the cylinders were activated.

It is therefore desirable to provide a gasoline internal combustion engine which reduces losses from throttling and engine friction.

SUMMARY OF THE INVENTION

The embodiments of the present application describe a variable stroke and compression ratio engine which employs multiple pistons connected to a wobbler. A crank with an axis of rotation has an upper journal with a first angle relative to the axis and a lower journal with a second angle with respect to the axis. A cradle connected for rotational motion with respect to the wobbler is carried by the crank with sliding engagement to the upper and lower journals for translation between a first high eccentricity position and second low eccentricity position.

Carrying the wobbler on the crank for actuation by the pistons allows translating the wobbler relative to the first angled journal on the crank to adjust bottom dead center position of the pistons, altering the stroke, and simultaneously translating the wobbler relative to the second angled journal on the crank for adjusting top dead center position of the pistons, thereby adjusting the compression ratio.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Figure 1:
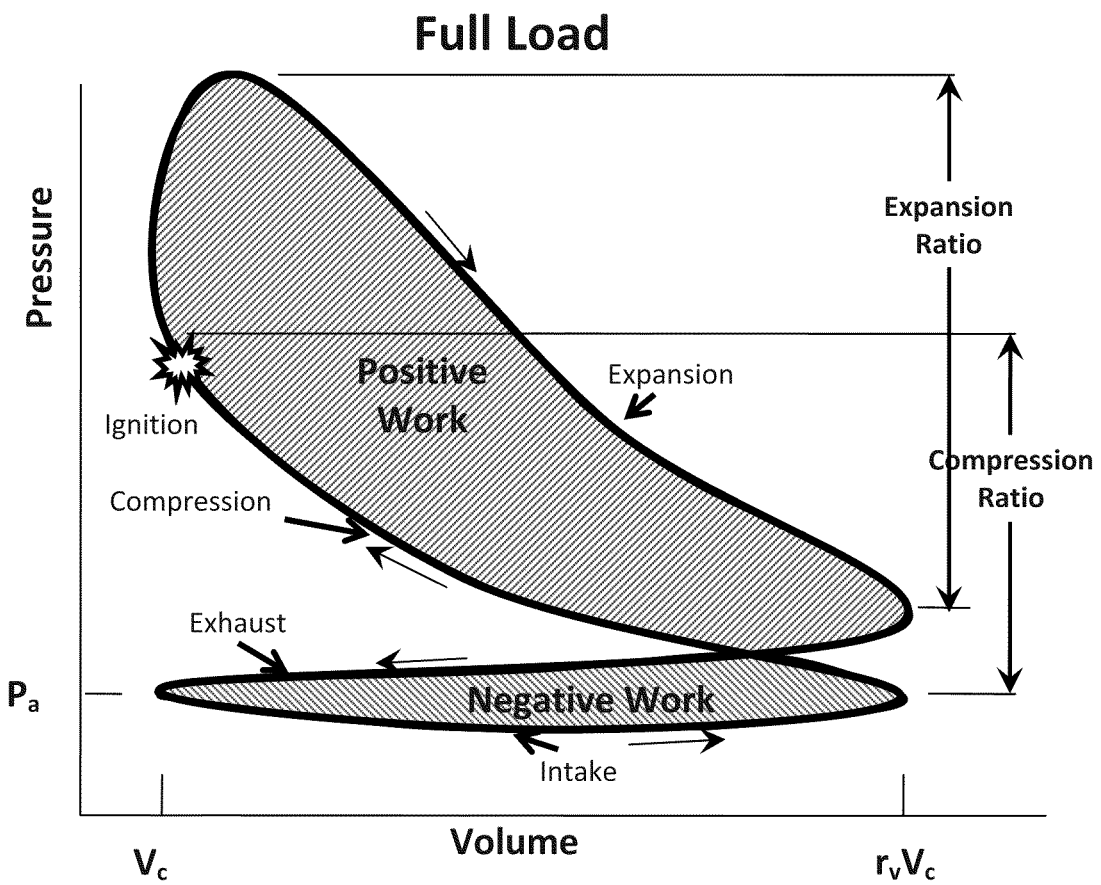
FIG. 1 is basic Pressure/Volume diagram for a prior art gasoline engine.
Figure 2:
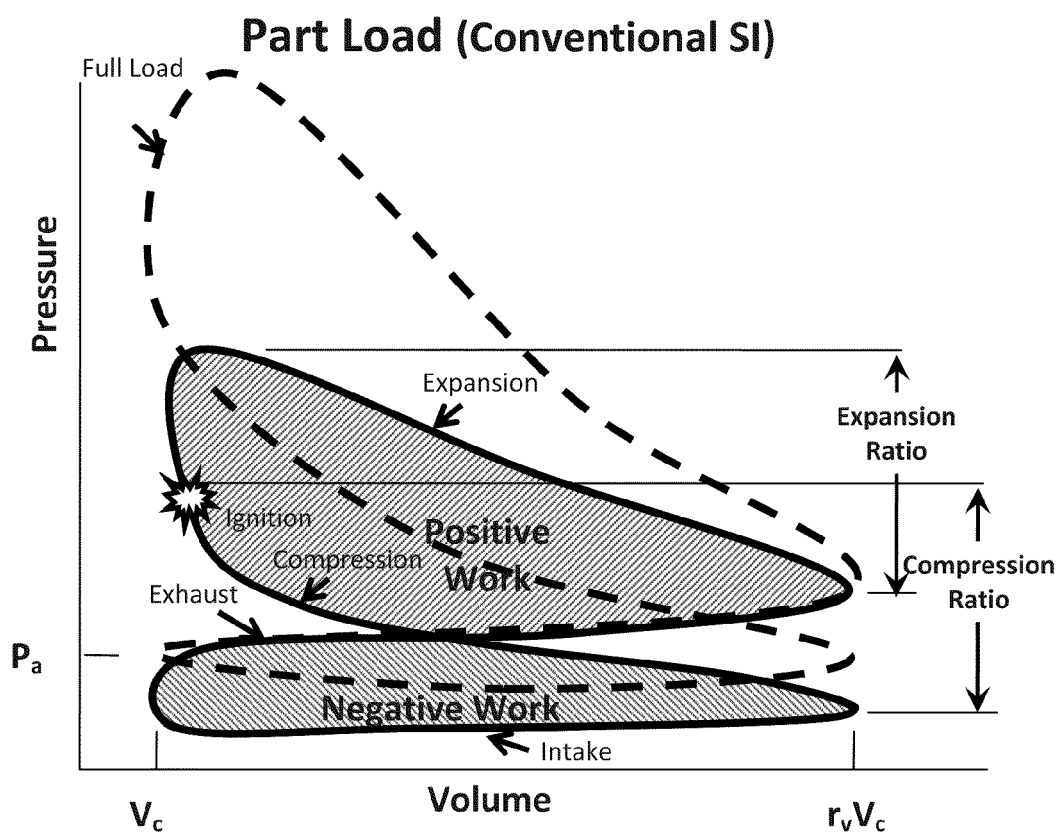
FIG. 2 is a graph of difference in pressure from the prior art engine's intake to exhaust due to throttling.
Figure 3:
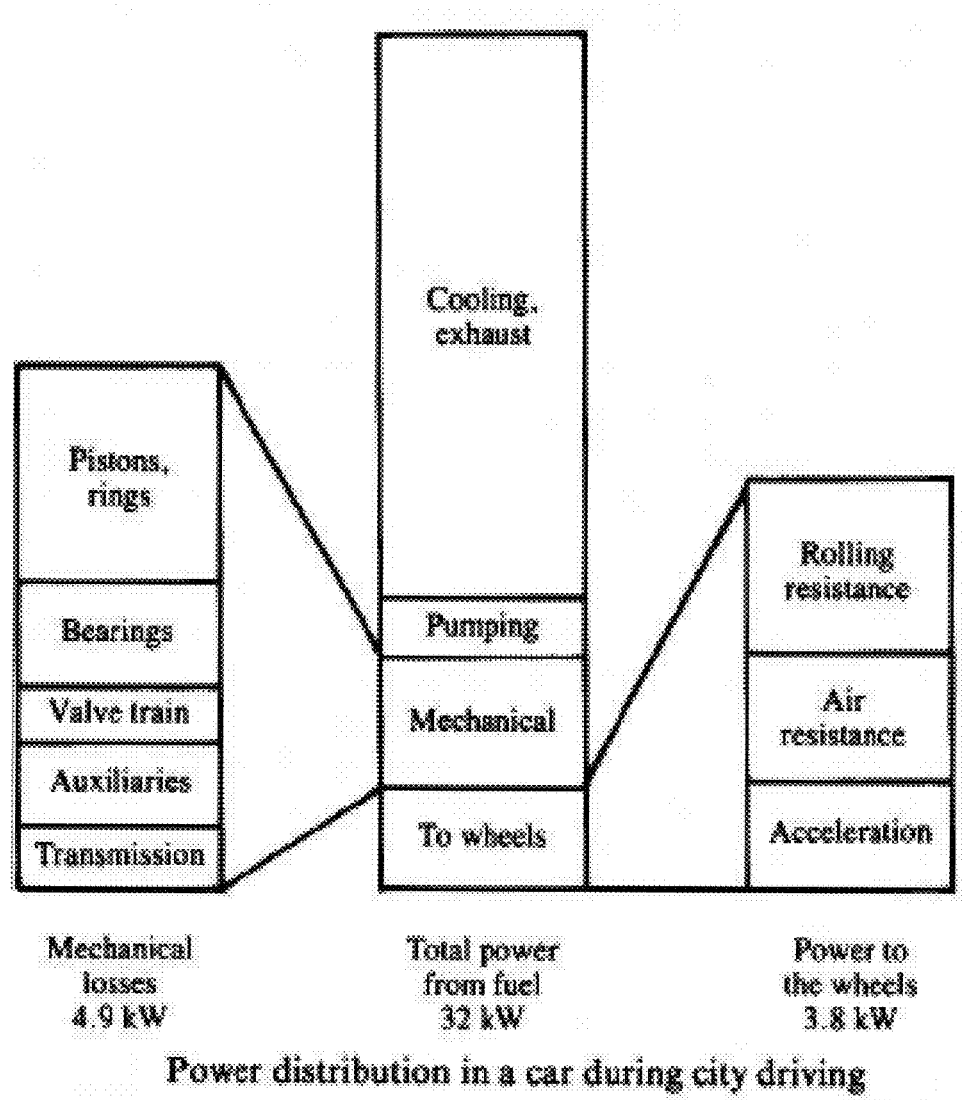
FIG. 3 is a bar chart of power distribution in a car in city driving.
Figure 4:
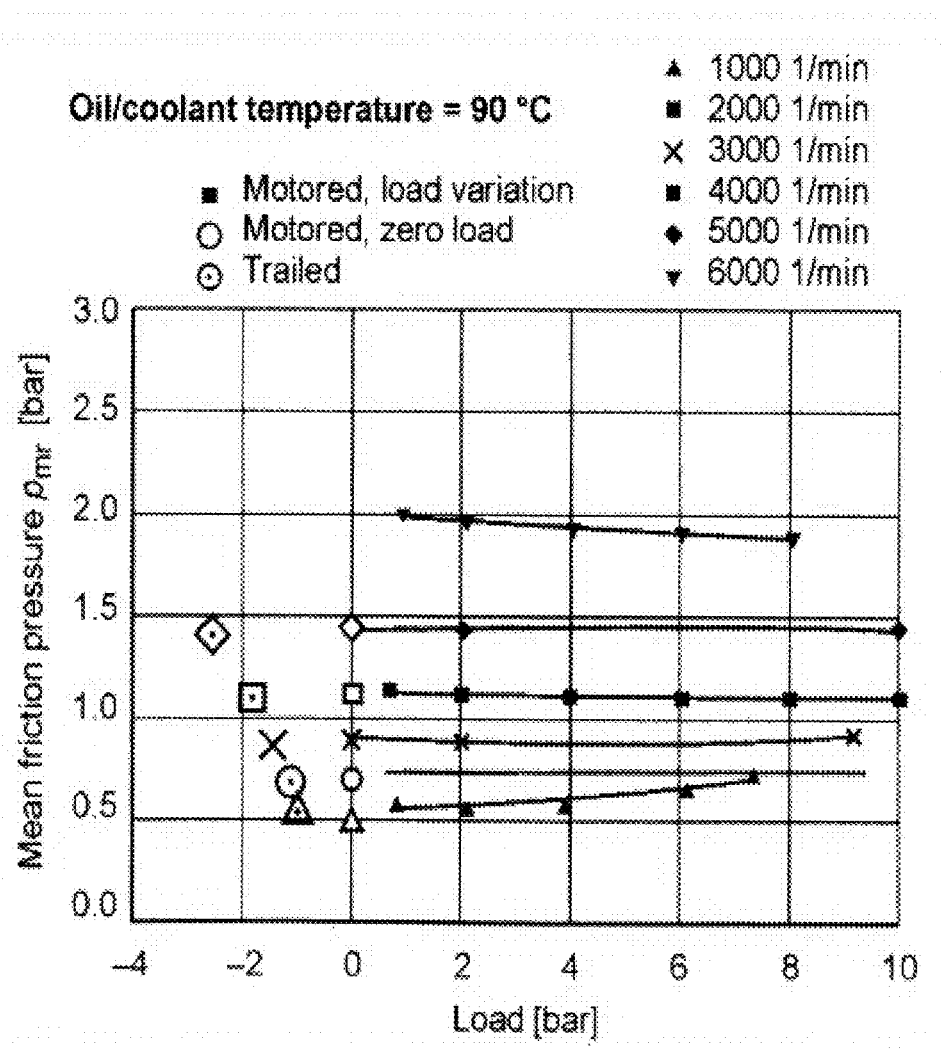
FIG. 4 is a graph of engine friction based on engine speed and load.
Figure 5A:
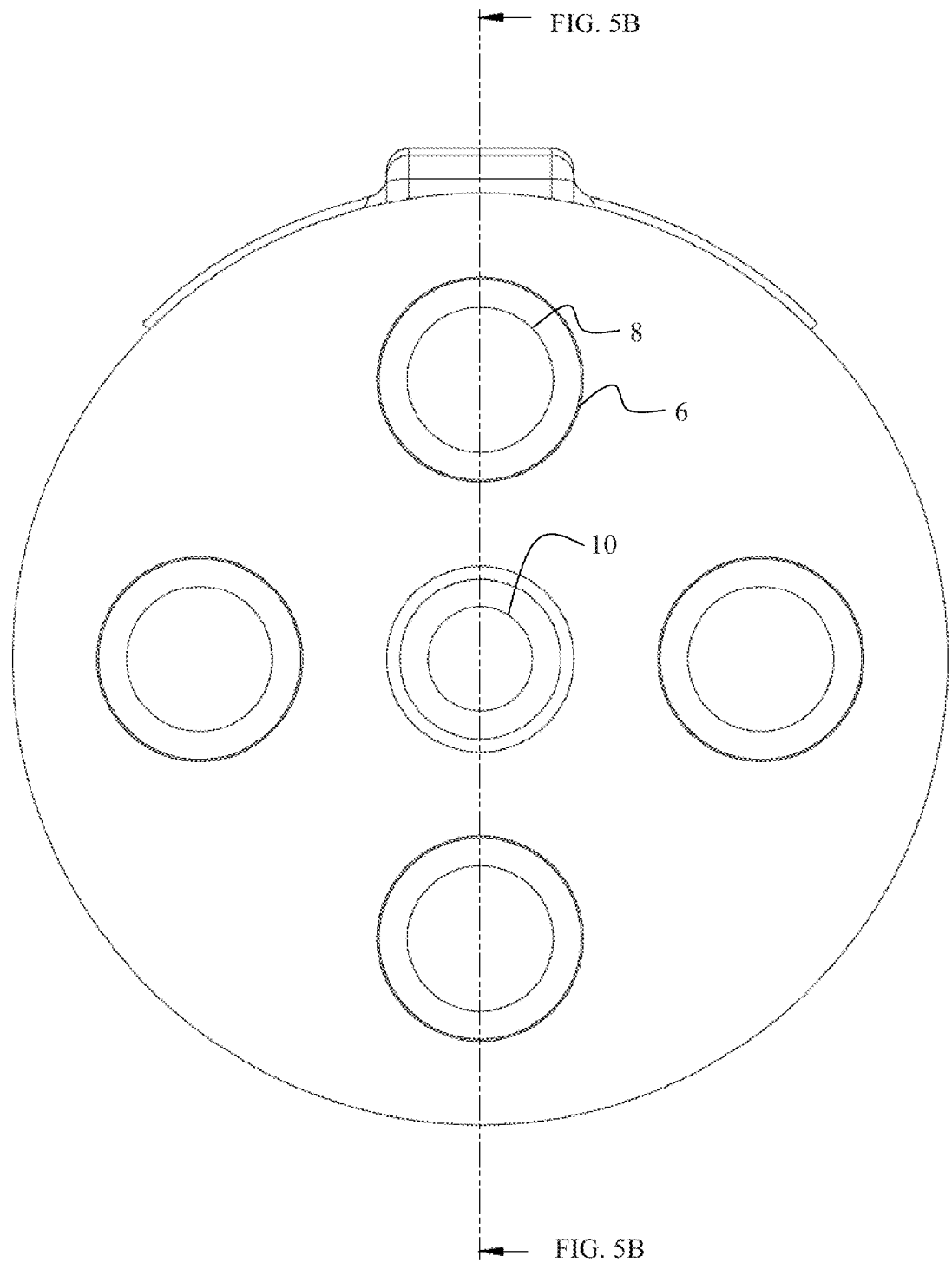
FIG. 5A is a top section view of an exemplary embodiment.
Figure 5B:
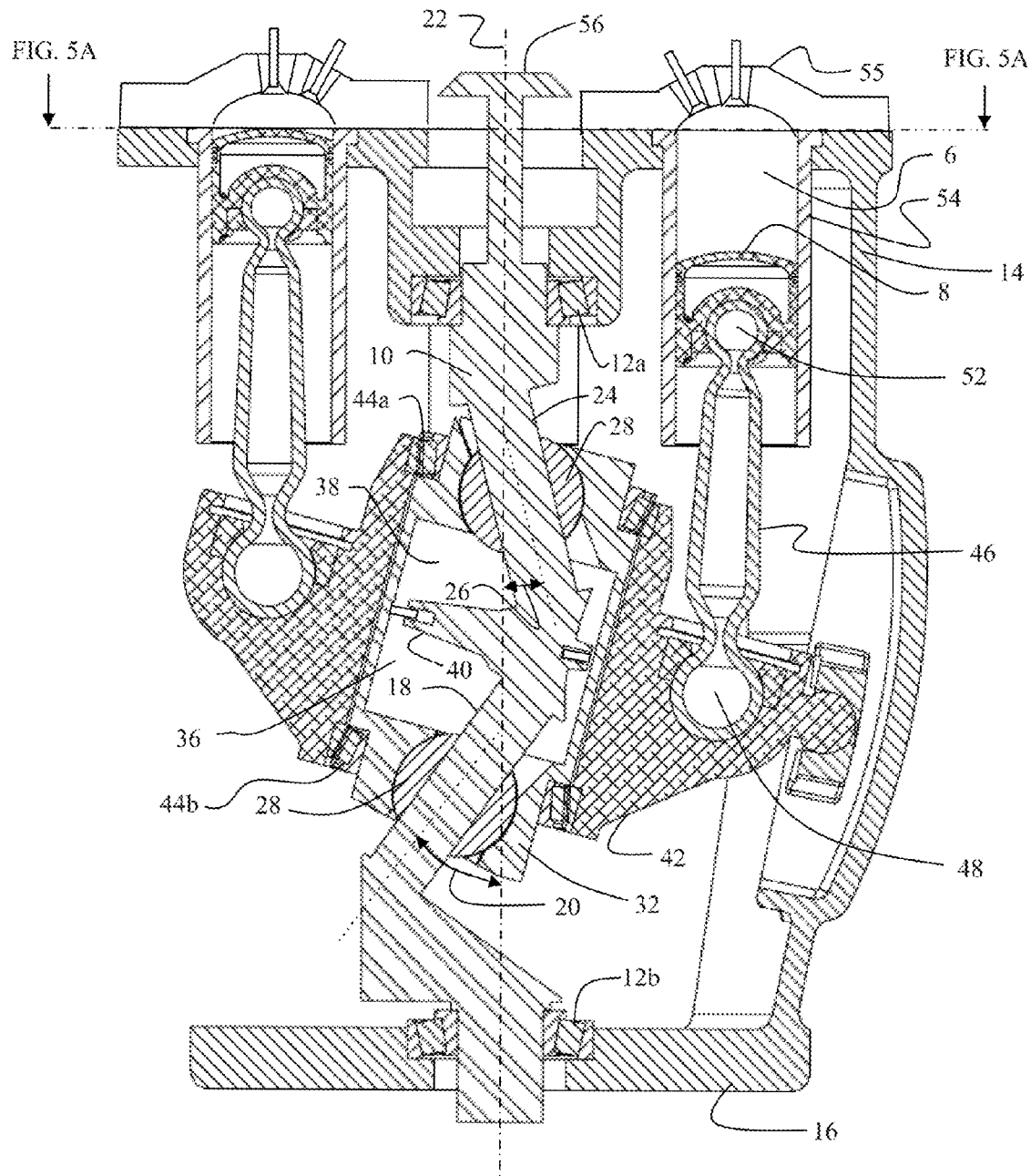
FIG. 5B is a side section view of the exemplary embodiment of FIG. 5A.
Figure 5C:
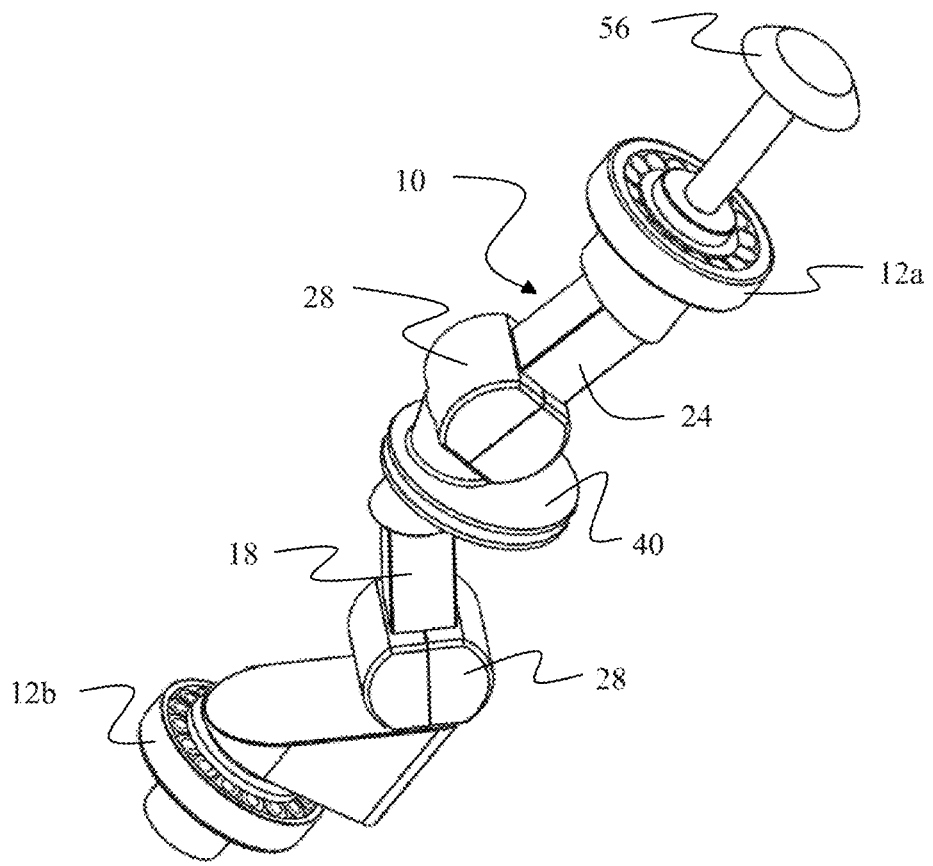
FIG. 5C is an isometric view of the crank showing details of the journals and bushings.
Figure 5D:
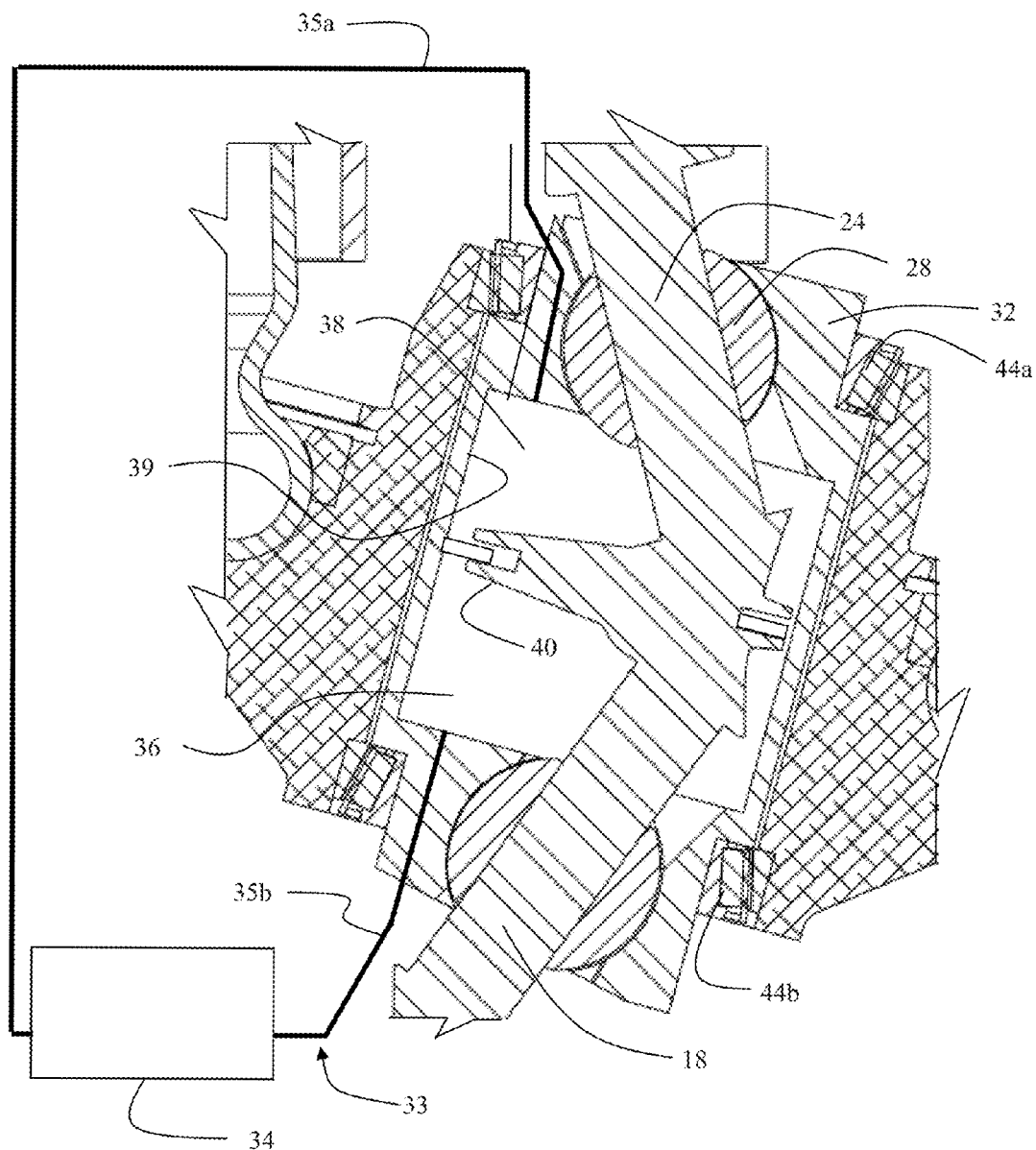
FIG. 5D is a schematic diagram of the hydraulic control circuit of the exemplary embodiment.

Referring to the drawings, FIGS. 5A and 5B show a first embodiment for a 4 cylinder engine with the cylinders 6 carrying pistons 8 arranged in a separated pattern. Though it appears as a square for the 4 cylinder configuration, the pattern is circular with the cylinders at 90 degree intervals. Another arrangement is a 6 cylinder engine with the cylinders arranged in a circular pattern at 60 degree intervals. These arrangements are sometimes referred to as "barrel engine" layouts. Additional configurations with an odd number of cylinders for enhanced even firing timing may be employed as will be described with respect to FIGS. 7A and 7B subsequently. As best seen in FIG. 5B, a crank 10 rotates in two bearings 12a, 12b, in cylinder block 14 and engine bedplate 16 respectively and has a lower journal 18 having a rectangular cross section and extending at an angle β (beta) 20 to the centerline of rotation 22, and upper journal 24, also having a rectangular cross section and extending at an angle α (alpha) 26 to the centerline of rotation. The rotation centerline for the crank is substantially parallel to the cylinders and direction of motion for the pistons. Each journal has a pair of split cylindrical slider bushings 28 mounted for sliding motion along the journal. The two sets of split bushings are captured in a carrier or cradle 32. The cradle 32, and split cylindrical slider bushings 28 all rotate as a control assembly with the crankshaft 10, the rectangular journals and mating slots in the slider bushings acting to lock the assembly as unit in the rotational plane. Details of the rectangular journals and the split bushings are best seen in FIG. 5C. The control assembly slides on the journals and is responsive to control by a hydraulic circuit 33 shown schematically in FIG. 5D with a pump and control unit 34 providing working fluid through conduits 35a and 35b. Cavities 36 and 38 are created in chamber 39 in the cradle by reacting plate 40 which is integral with or attached to the crankshaft 10 thereby providing a double acting hydraulic circuit. To lengthen the stroke, oil is admitted under pressure from the pump and control unit through conduit 35a into cavity 38 and relieved from cavity 36 through conduit 35b which pushes the control assembly carried by cradle 32 to higher eccentricity. To shorten the stroke, oil is admitted under pressure into cavity 36 and relieved from cavity 38 to push the control assembly to lower eccentricity. Variation of the stroke and adjustment of the compression ratio are simultaneously accomplished by motion of the cradle on the crankshaft with the split bushings on the upper and lower journals translating at different angles, $\alpha$ and $\beta$. The dual angle journals on the crank effectively allow a change in output power by controlling the Volume axis rather than conventional throttling which changes the Pressure axis of the engine's PV diagram.

A wobbler 42 is connected to the cradle 32 using bearings 44a, 44b and is connected to the engine bedplate 16 through an anti-rotation mechanism to be described in greater detail subsequently. The bedplate or case for the engine disclosed in the embodiments herein is solely for exemplary purposes. The actual shape and configuration of the bedplate may be altered as required to accommodate engine mounting, cooling system passages, auxiliaries such as oil pump and water pump and other interface applications. The rotation of the cradle and associated control elements and the constraining anti-rotation feature cause the wobbler to create a sinusoidal motion at each of its connections to connecting rods 46. The connecting rods are connected to the wobbler through ball and socket big end rod bearings 48 to accommodate the required degrees of freedom for motion of the wobbler. In alternative exemplary embodiments hydrostatic, hydrodynamic bearings or rolling element anti-friction bearings may be employed.

Connecting rods 46 are driven by pistons 8 and connected by the little end bearings 52 which are also ball and socket bearings. For the embodiment shown, the static structure of the engine consists of the bedplate 16, the cylinder block 14, and the cylinder liners 54. One skilled in the art may note that the engine could be configured with integral cylinder bores or with wet or dry liners.

Figure 5E:
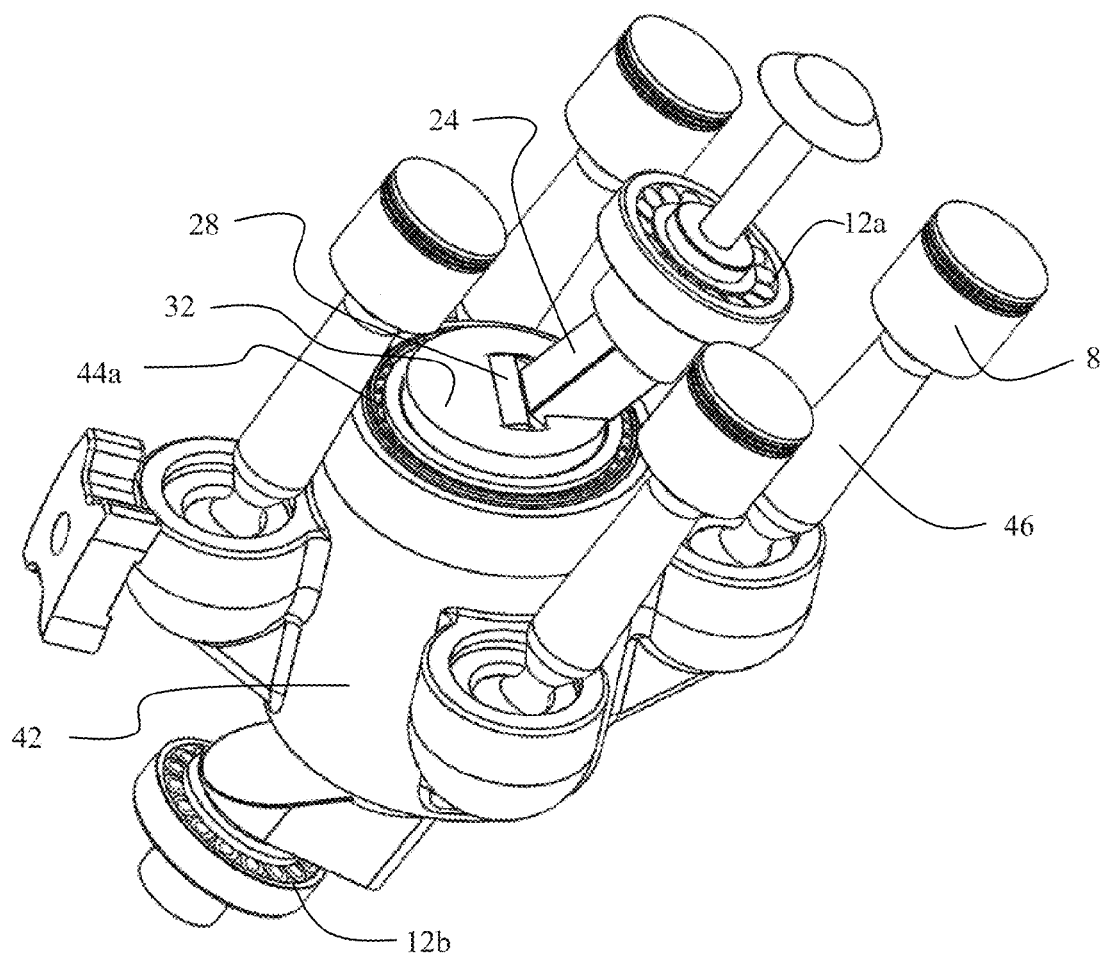
FIG. 5E is an isometric view of the exemplary embodiment with the bedplate, cylinder block and cylinder liners removed for clarity.
Figure 5F:
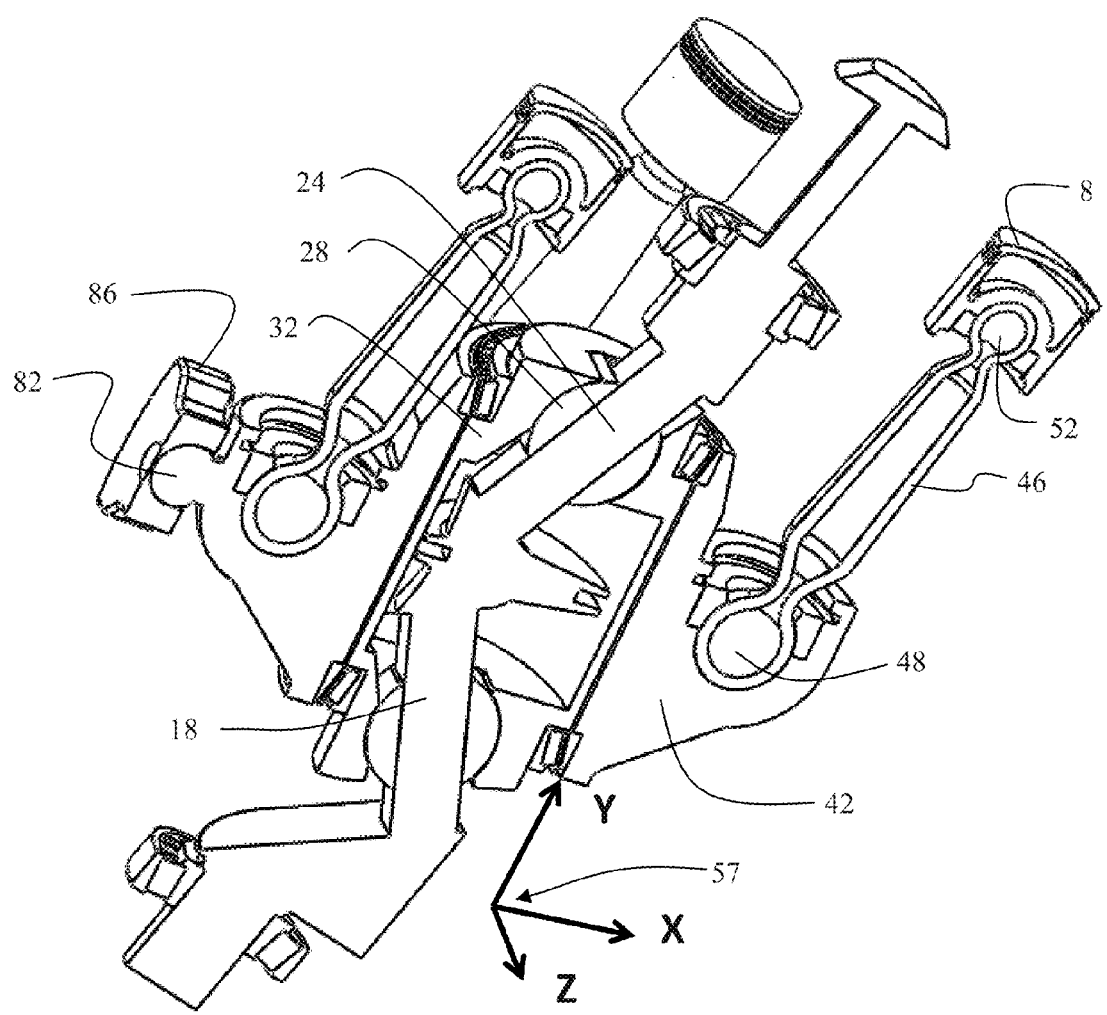
FIG. 5F is an isometric section view of the embodiment as shown in FIG. 5E.

Details of the operating elements of the engine are shown in FIGS. 5E and 5F with the bedplate, cylinder block and cylinder liners removed for clarity. The embodiment disclosed requires appropriate interfacing of the operating elements to provide the required degrees of freedom to allow operability of the system. FIG. 5F shows the operating elements in isometric section relative to an orthogonal reference frame 57. The rod big end bearing 48 of an exemplary cylinder assembly must provide for rotation in the XY plane to accommodate the linear motion of the piston and the wobbler radius path created from going from TDC to BDC.

Bearings 48 also must also accommodate rotation in the YZ plane which is created by the wobbler going from TDC to BDC in adjacent cylinder assemblies. Additionally, bearings 48 must accommodate rotation of the wobbler in the XZ plane because the center of the wobbler in a plane containing the center points of the four rod big ends bearings is not on the center of rotation of the crankshaft, so the center of the wobbler in the aforementioned plane creates a circle through one 360 degree rotation. The diameter of this circle is variable, increasing with increased stroke.

Rotation in the XY, YZ, and XZ planes requires 6 degrees of freedom in this joint. Therefore any two combinations of 2 dimensional joints (translating or rotating) cannot provide sufficient freedom of movement. A ball and socket joint will provide this freedom to accommodate the required motion.

Similarly, the rod little end bearing 52 must accommodate more than the two degrees of freedom associated with a conventional wristpin joint. As piston 8 approaches mid-stroke, there is an angle in the XY plane that must be accommodated. In addition, the crank is offset in the Z direction creating the stroke for adjacent pistons. Therefore the little end joint must accommodate an angle in the YZ plane concurrently to the angle in the XY plane. Thus, more than 2 degrees of freedom are required.

For the embodiment shown, the crankshaft 10 extends through the engine cylinder block 14 and bedplate 16 carried in bearings 12a and 12b respectively and has a gear 56 mounted to drive the valve train (not shown) for combustion air and exhaust communication with the cylinders in a substantially conventional piston head (generally designated 55). Conventional IC engine practice can be used to design the cylinder heads and valve train in a multitude of configurations. In alternative embodiments, the helical gear valve train driven by gear 56 is replaced by a pushrod valve-train driven by an axial cam or electronic valve actuation.

Figure 6A:
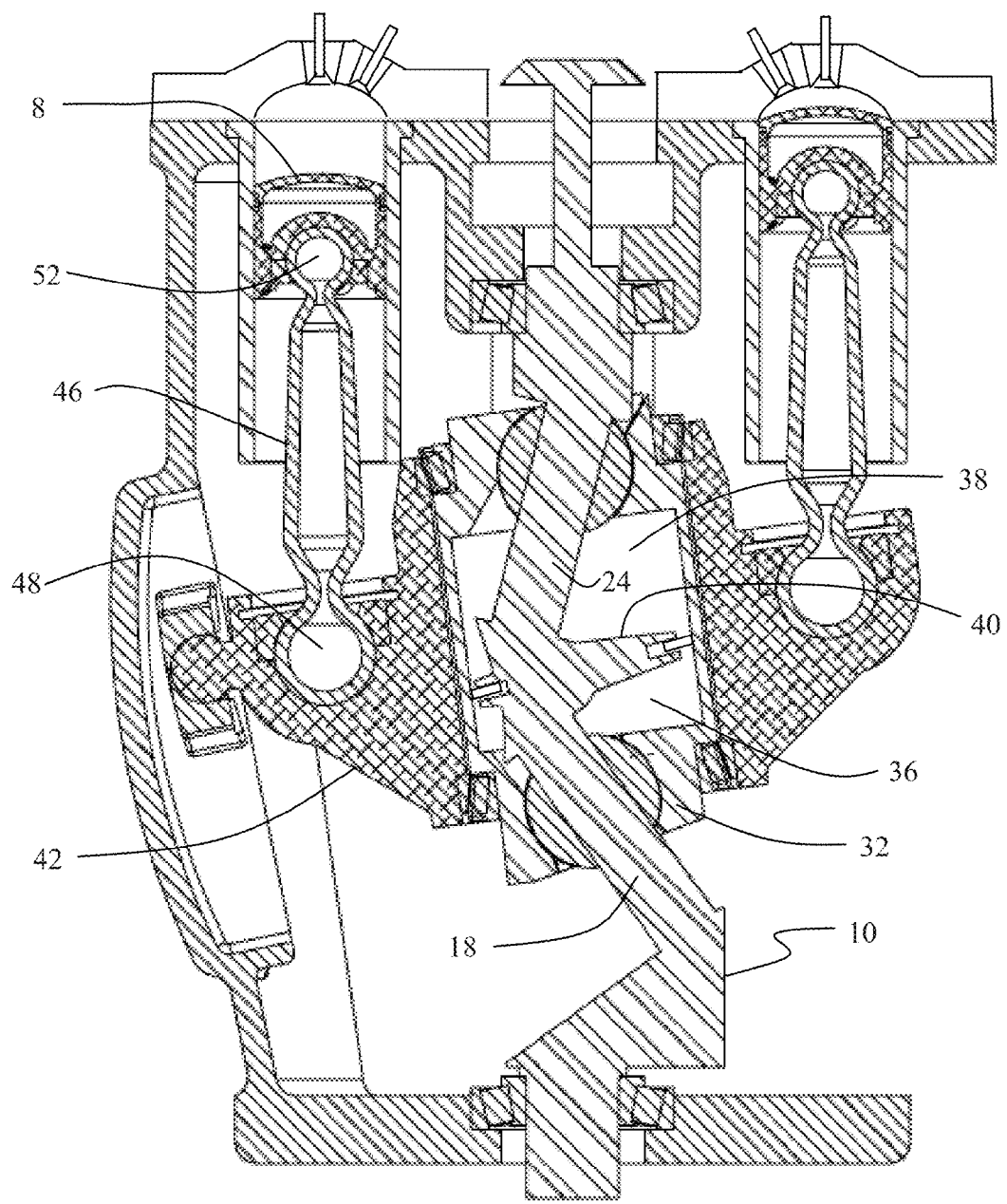
FIGS. 6A 6B and 6C are side section views of the exemplary embodiment of FIG. 5B at minimum stroke, intermediate stroke and maximum stroke.
Figure 6B:
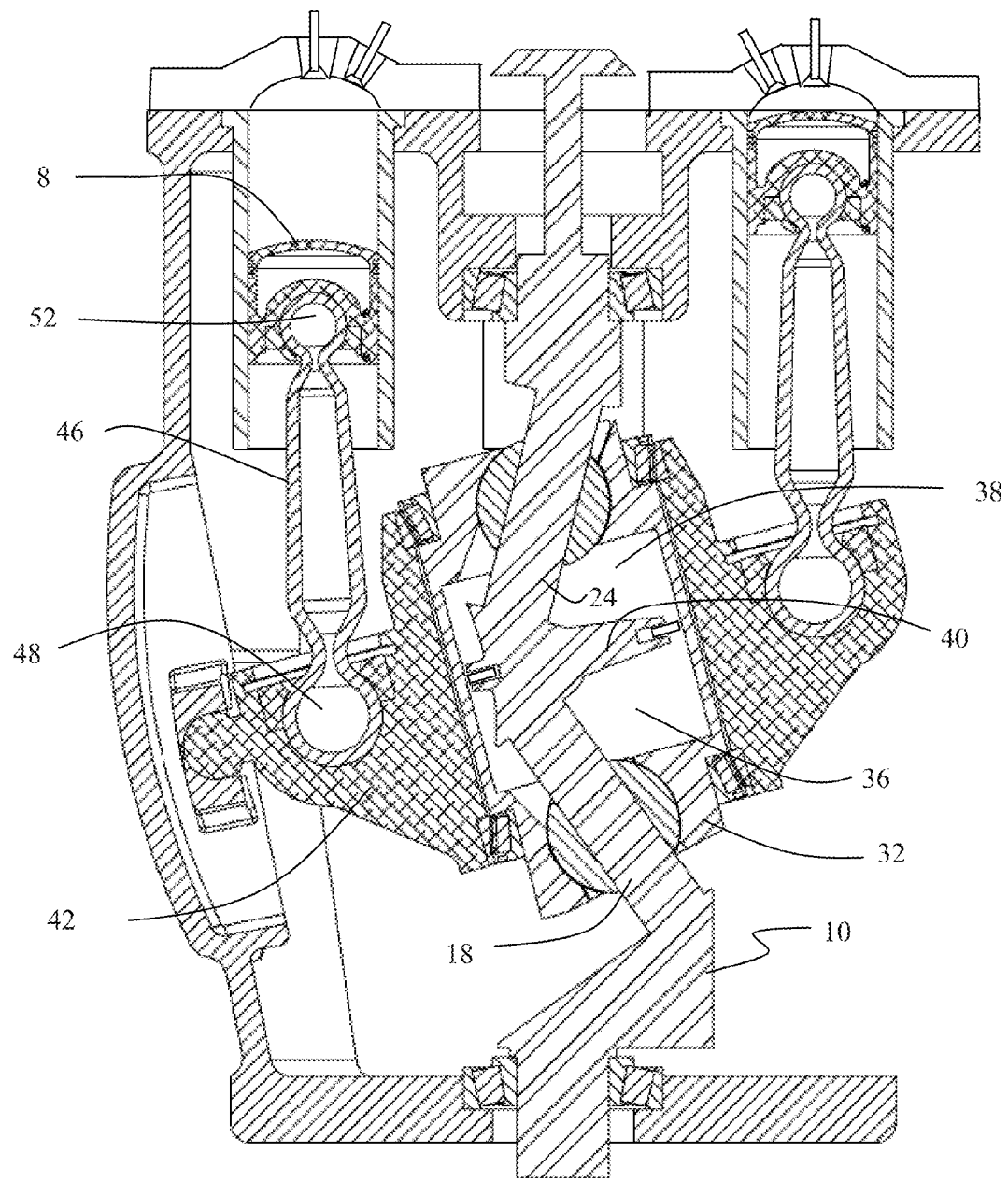
Figure 6C:
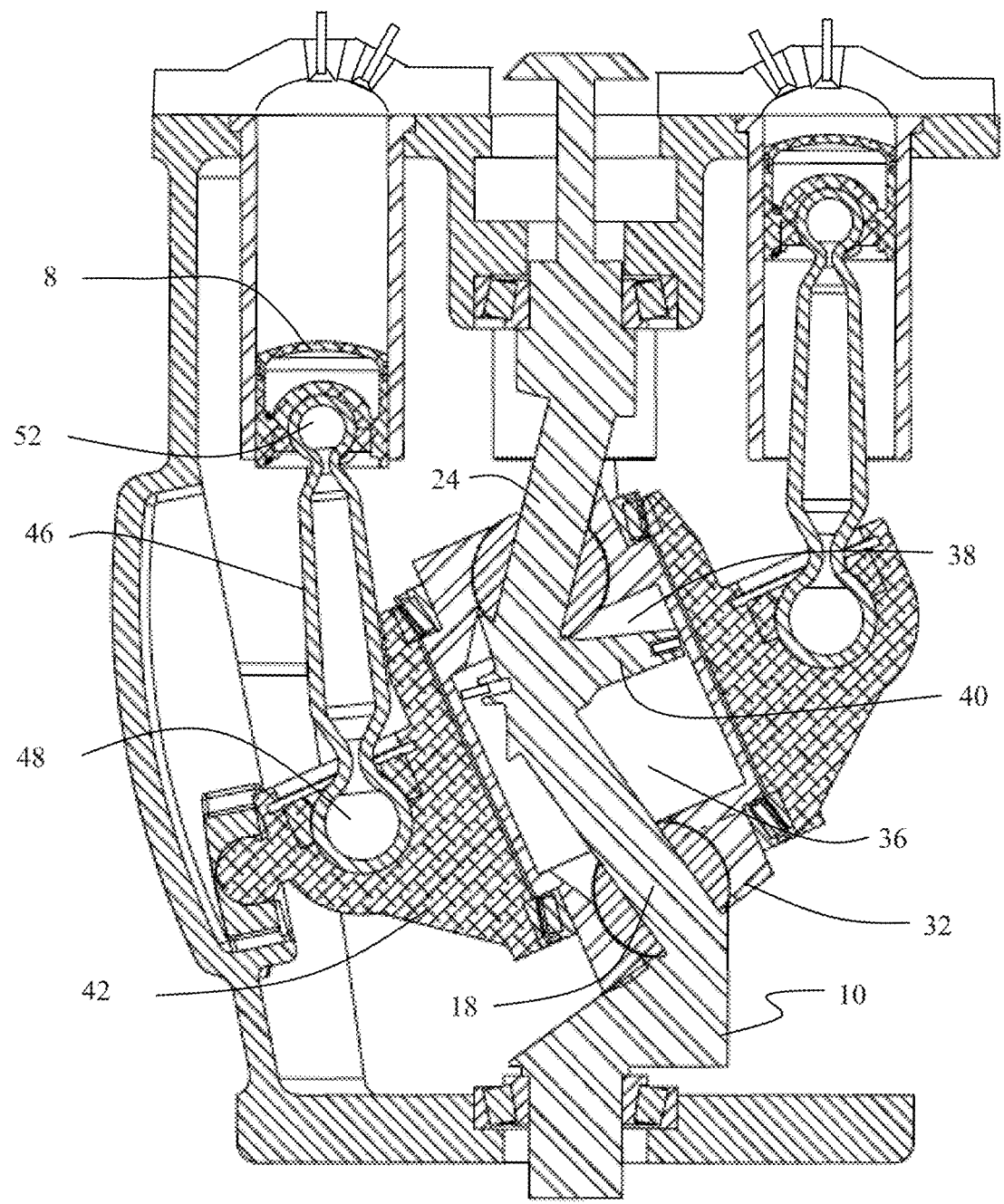

As shown in FIGS. 6A-6C, engine operation may be modified from a minimum stroke configuration, FIG. 6A, to an increased stroke as shown in FIG. 6B by admitting oil under pressure into cavity 36 and relieving pressure from cavity 38 to push the cradle and control elements to lower eccentricity. FIG. 6C shows the control assembly positioned for maximum stroke. The rods 46 remain substantially vertical throughout the operating range as opposed to conventional IC engines where the big end of the rod rotates about the crank throw and imparts substantial side loads on the pistons.

The mechanism at full stroke, thus full power at a given engine speed, is shown in FIG. 6C, while FIG. 6B depicts the mechanism at partial stroke (approximately ¼ full stroke). The piston on the left is at top dead center (TDC) for that stroke. In FIG. 6A the piston has moved further into the head reducing the final combustion volume when compared to full stroke in FIG. 6C thereby adjusting the CR. A variable lift mechanism may be required for the embodiments shown to prevent the valves from hitting the pistons on reduced stroke settings. Optimum performance may also be enhanced with such valve lift by reduction at lower strokes.

When the engine is at partial load as shown in FIG. 6B, the displacement is reduced to match the power requirement, eliminating the throttling losses yet maintaining the full compression ratio and expansion ratio of the engine. The piston speed is reduced by a factor of 4 thus reducing the speed related friction loss of the pistons and rings by a factor of 16 and there is very little friction-generating side load on the pistons.

Figure 6D:
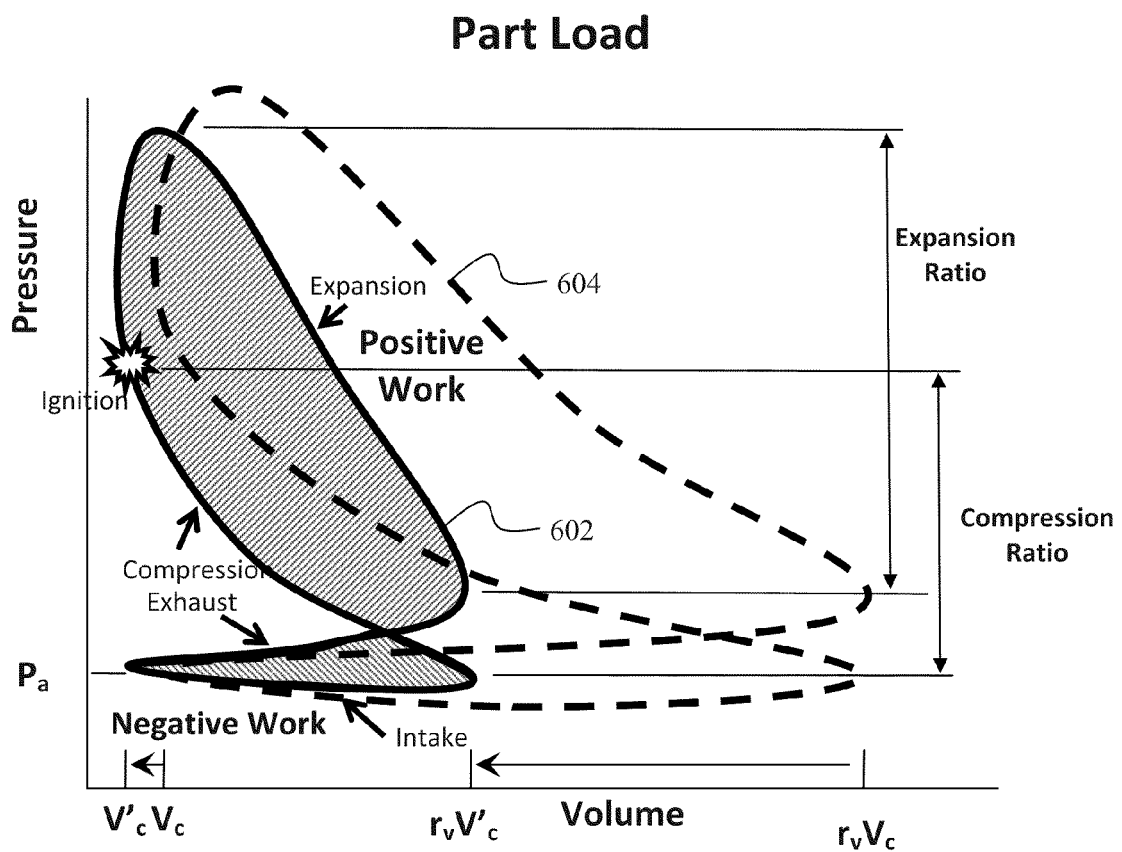
FIG. 6D is a Pressure/Volume diagram for the exemplary embodiment.

As shown in the PV diagram of FIG. 6D, the present embodiment maintains substantially full compression and expansion ratios and minimizes negative pumping work shown by the part load map contour 602 relative to the full load map contour 604. The resulting cycle maintains high engine efficiency.

Figure 7A:
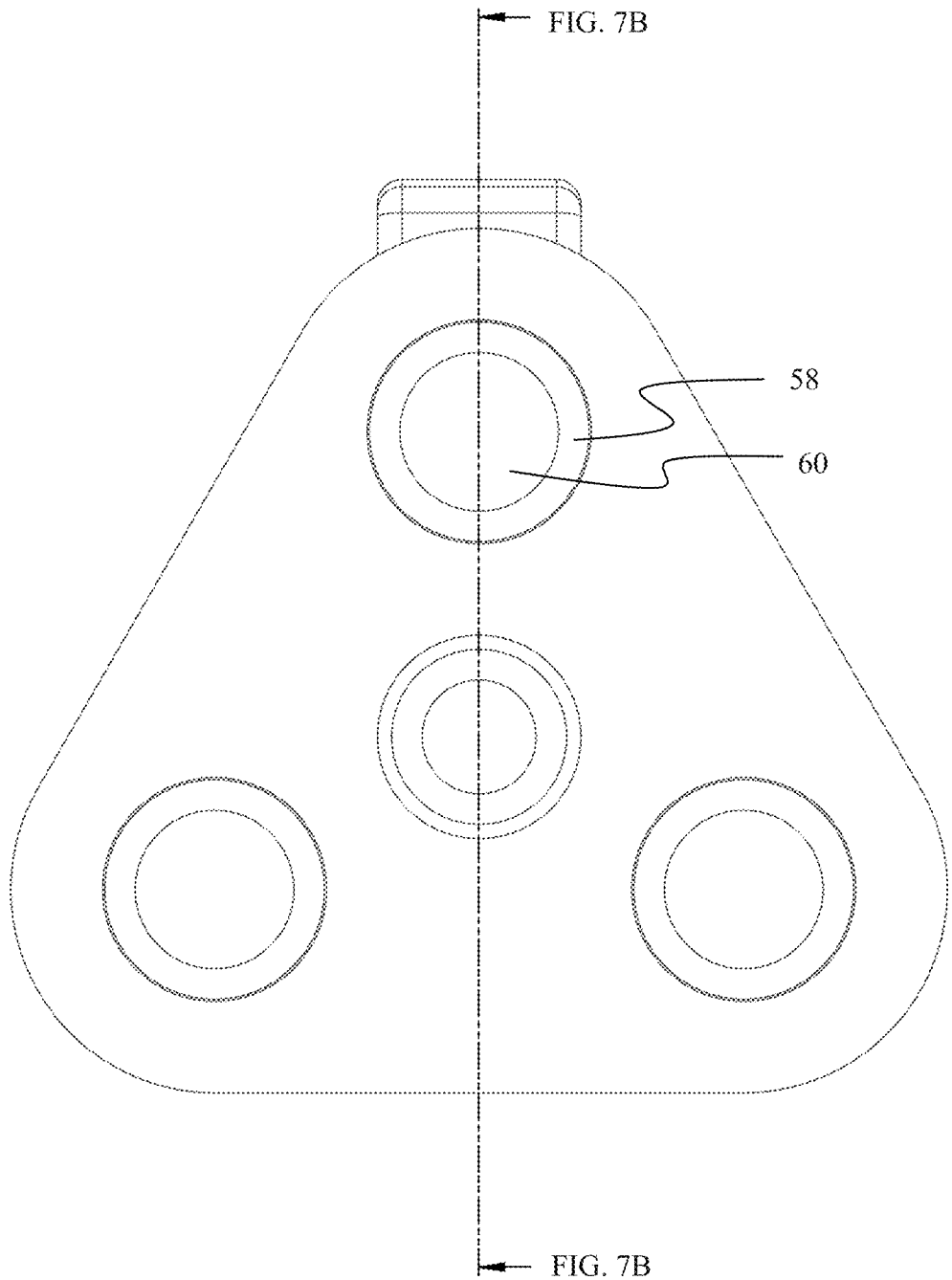
FIG. 7A is a top section view of an alternative embodiment with three cylinders.
Figure 7B:
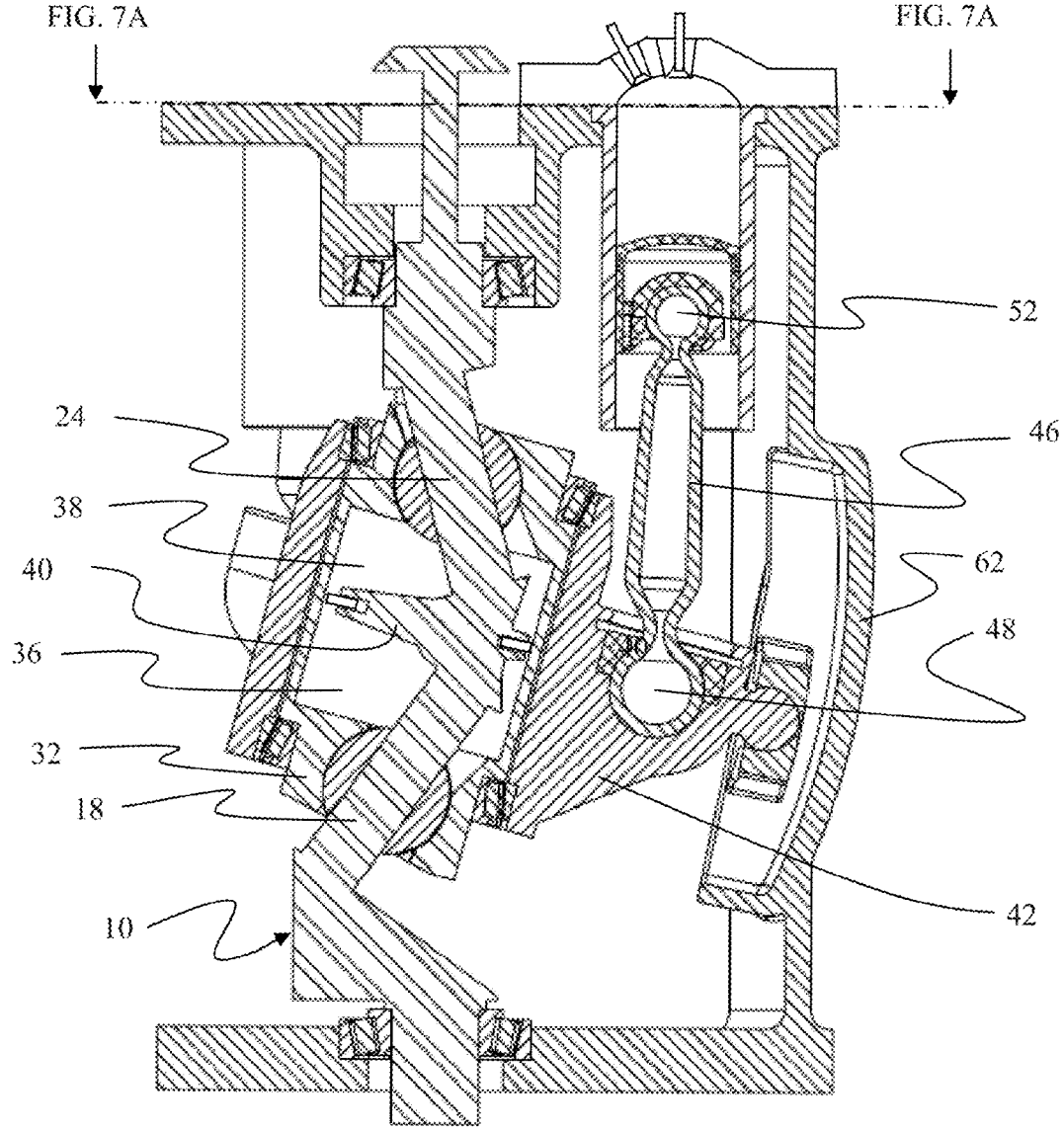
FIG. 7B is a side view of the alternative embodiment of FIG. 7A with the case sectioned to show cylinder placement.

FIGS. 7A and 7B show an alternative embodiment having three cylinders 58 and associated pistons 60 spaced at 120° offset around the circular pattern. Other features of the embodiment remain substantially similar to those described for the initial embodiment. The track for the anti-rotation device, to be described in greater detail subsequently, is carried in blister 62 extending from the engine base plate 64. A five or 7 cylinder alternative may also be employed for certain applications.

Figure 8A:
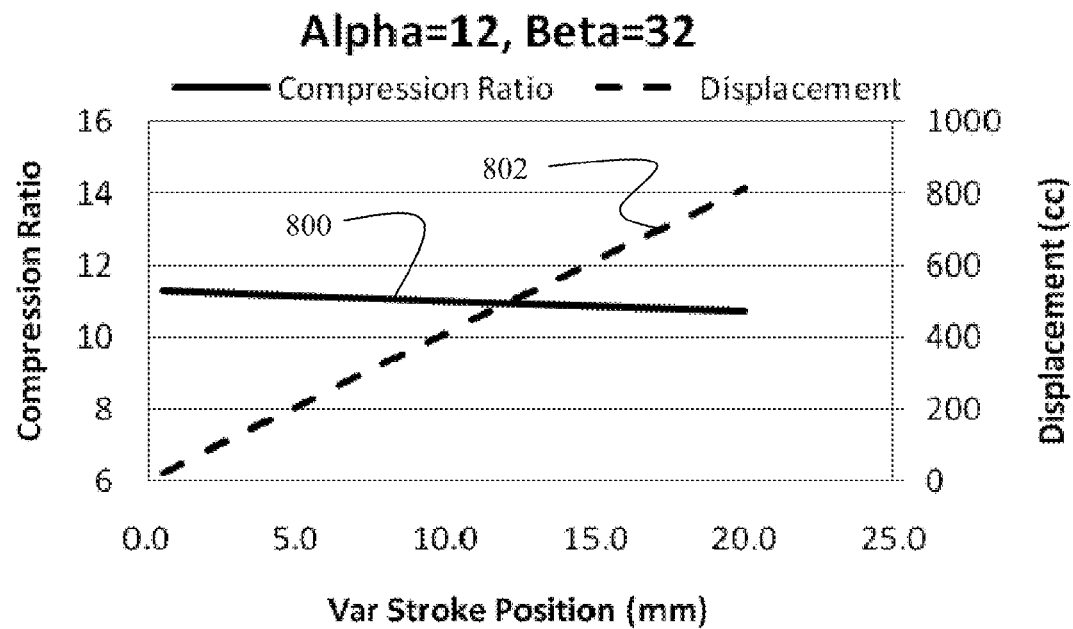
FIGS. 8A, 8B, 8C, 8D and 8E are graphs of compression ratio and stroke variation for selected lower and upper journal angles.
Figure 8B:
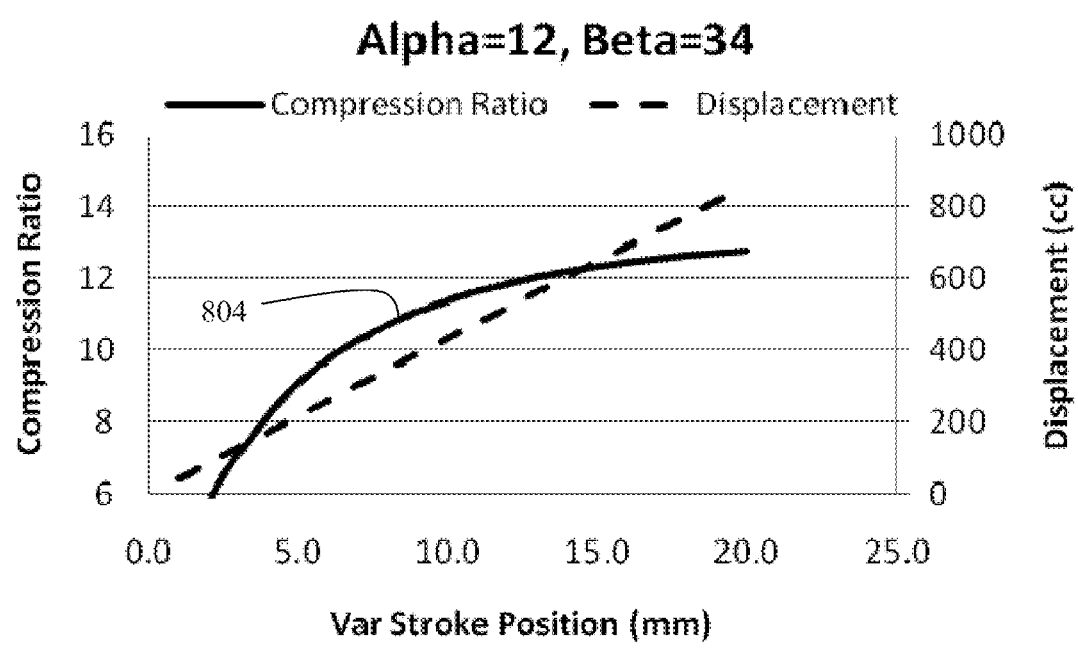
Figure 8C:
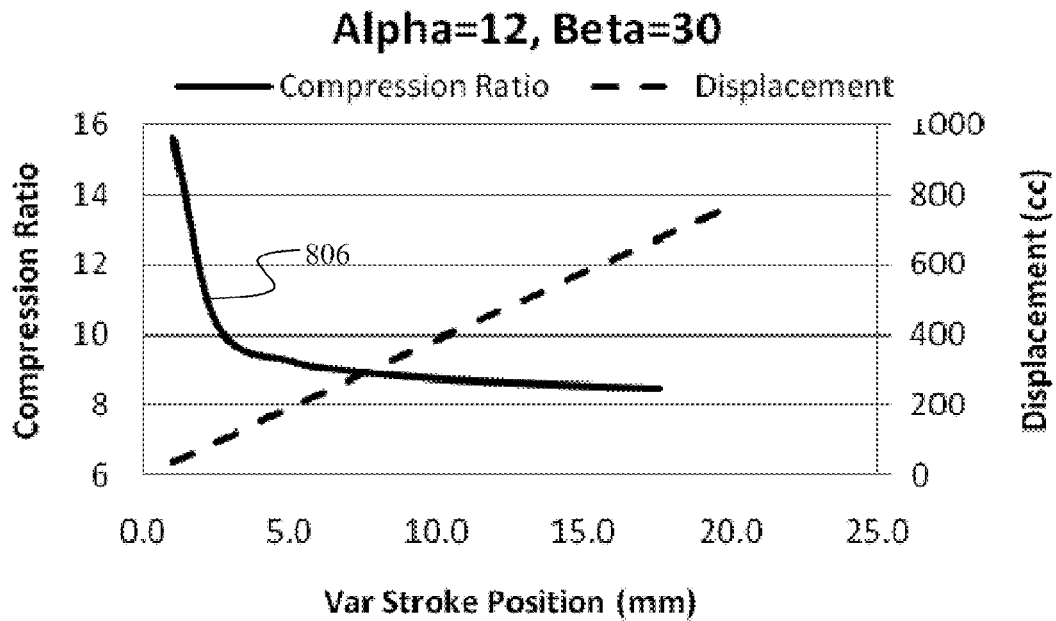
Figure 8D:
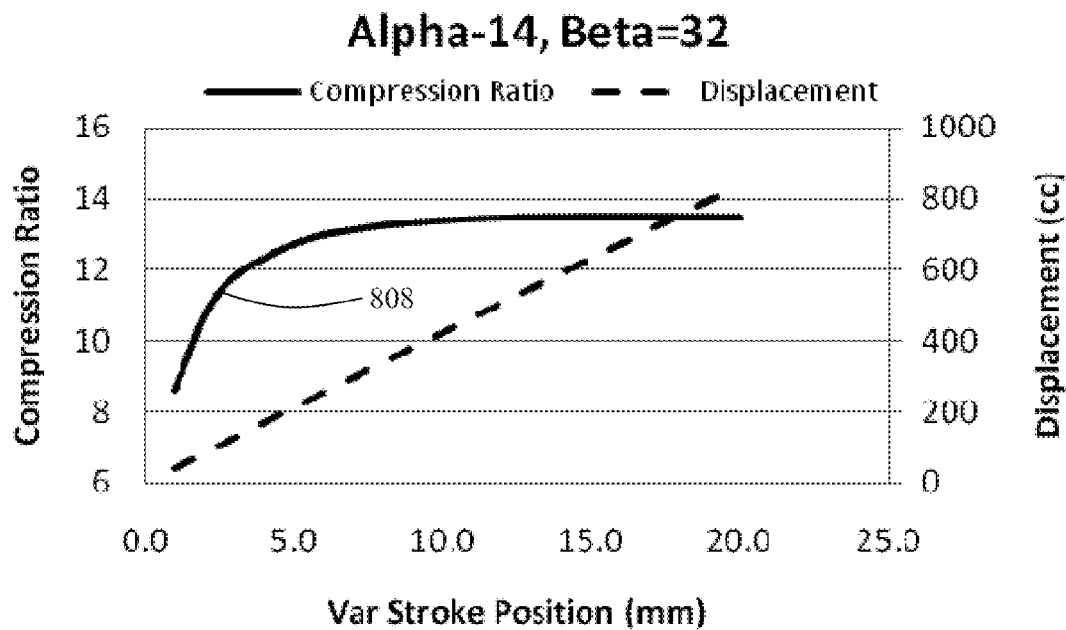
Figure 8E:
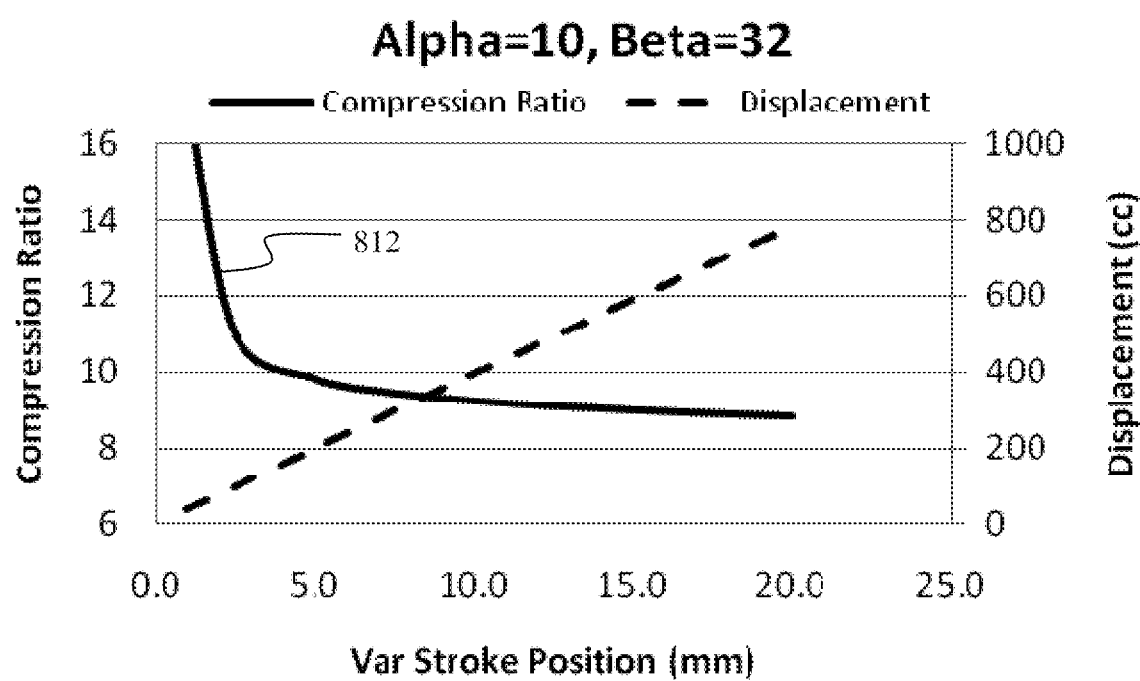

Returning to the first embodiment, lower journal 18 and upper journal 24 on the crankshaft function separately based on the associated angle $\alpha$ and $\beta$ with the upper journal adjusting the position of the piston at Top Dead Center (TDC) and the lower journal adjusting the position of the piston at Bottom Dead Center (BDC). The maximum displacement is a function of the lower journal angle β (angle to the centerline of the crankshaft). The relationship of compression ratio (CR) to the displacement is a function of the upper journal angle α. While this angle can be chosen to maintain a substantially fixed CR, it also can be chosen to optimize the CR as a function of engine load. FIGS. 8A-8E demonstrates exemplary combinations of α and β. In FIG. 8A with α=12° and β=32°, the CR, trace 800, increases slightly as the load is reduced with displacement created by the variable stroke shown in trace 802. Since the efficiency of the engine is a function of the CR, and the CR is limited by knock in a gasoline spark ignition engine, it may be possible to improve the part load efficiency further by increasing the compression ratio as the load decreases (combustion is further from the spark-knock limit at lower load). Tailoring of the compression ratio of the engine to the combustion system for an optimized solution is therefore possible with selection of α and β. FIG. 8B shows an alternative CR tailoring with β=34° wherein the CR, trace 804, increases with increasing displacement. Similarly, FIG. 8C shows another CR tailoring with α=14° β=30° wherein the CR, trace 806, decreases with increasing displacement. If α is increased to 14° with β=32° as shown in FIG. 8D, the CR trace 808, shows an initial increase with increasing displacement with a leveling of CR for higher displacements. Similarly, if α is decreased to 10° with β=32° as shown in FIG. 8E, the CR trace 812, shows a similar profile to that of FIG. 8B. For the embodiments disclosed herein, α has a range of 10° to 16° while β employs a range from 28° to 40°. In certain alternative embodiments, α may have a range defined as $0° < \alpha \leq 16°$. In advanced embodiments, the upper and lower journals may be curved to provide a variation in effective α and β over the range of travel of the cradle on the journals.

Figure 9:
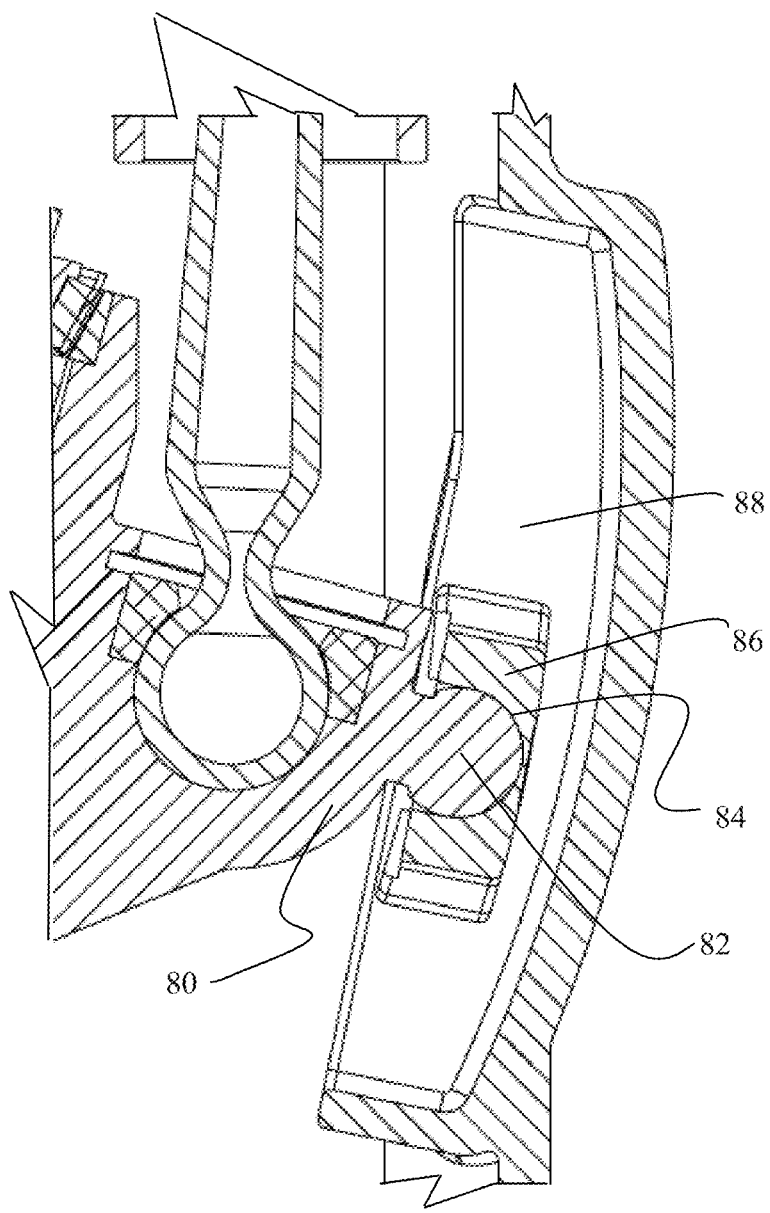
FIG. 9 is a partial side section detail view of an anti-rotation device.

To preclude instability or efficiency loss through undesired rotation of the wobbler in conjunction with the crank shaft, an anti-rotation device is employed as shown in FIG. 9. One wobbler arm 80 incorporates a tip extension having a ball 82 received in a socket 84 in a translating shoe 86. The shoe is constrained for reciprocal motion in a track 88 contained in or extending from the bedplate of the engine. As with the rods, the use of a ball and socket bearing for the anti-rotation device allows the multiple degrees of freedom required by the wobbler motion.

Figure 10A:
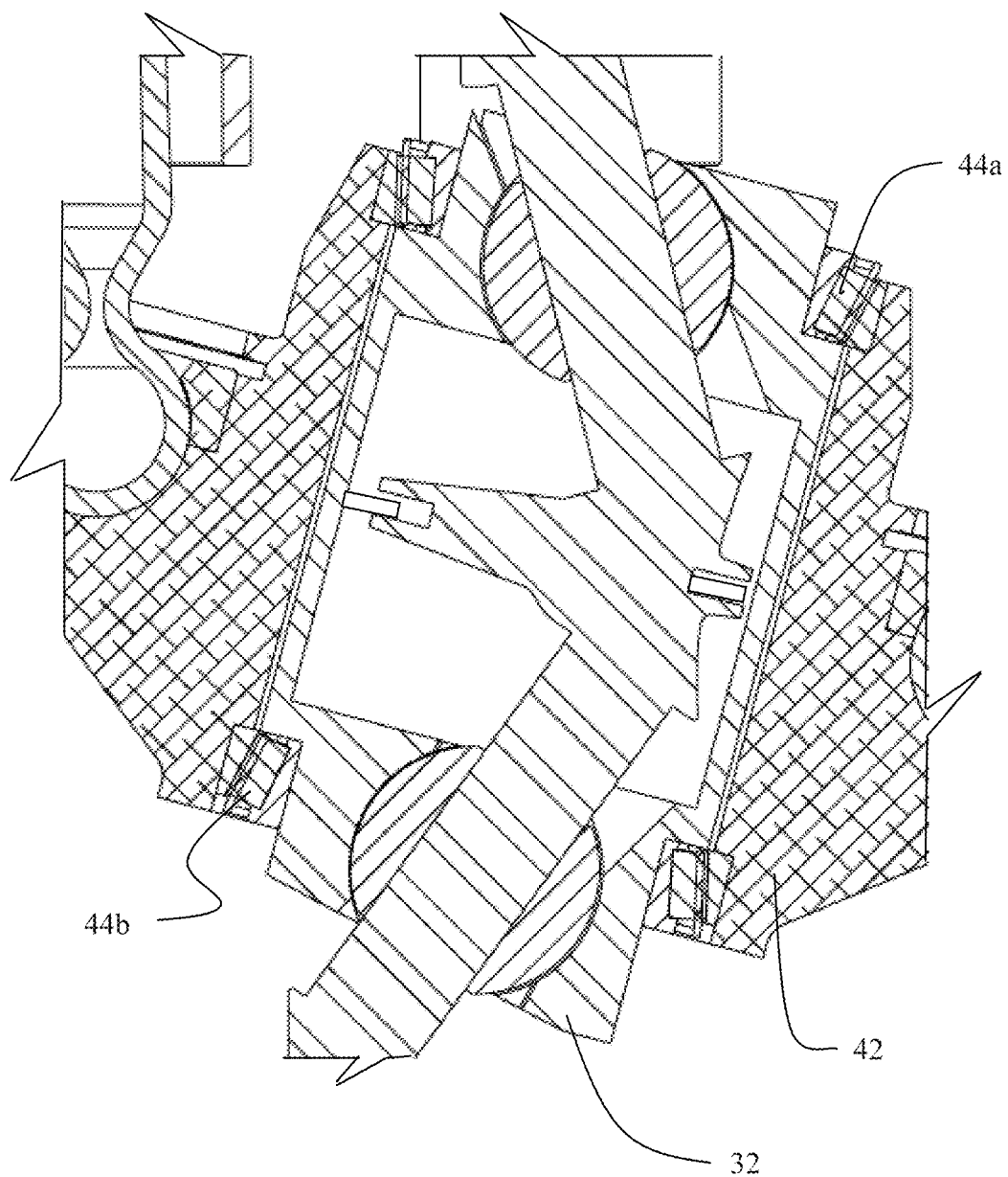
FIG. 10A is a partial side section detail view of the wobbler with the cradle and control assembly.
Figure 10B:
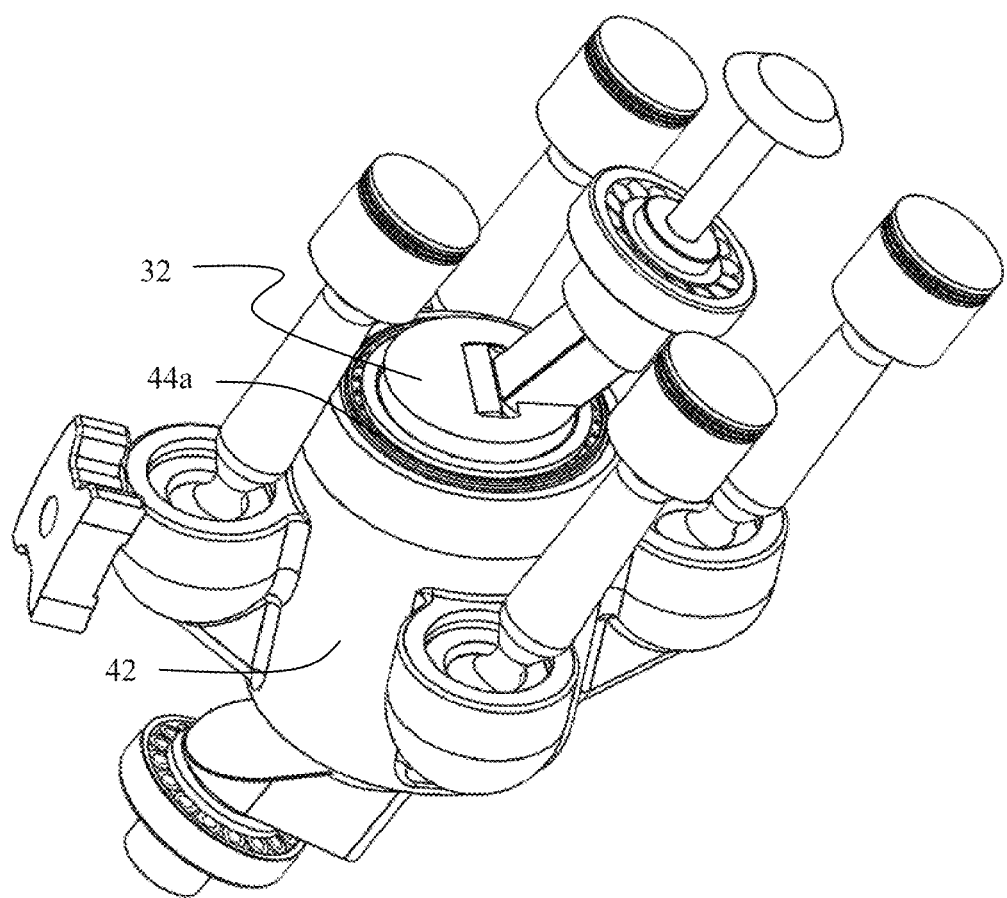
FIG. 10B is an isometric view of the elements shown in FIG. 10A.
Figure 11:
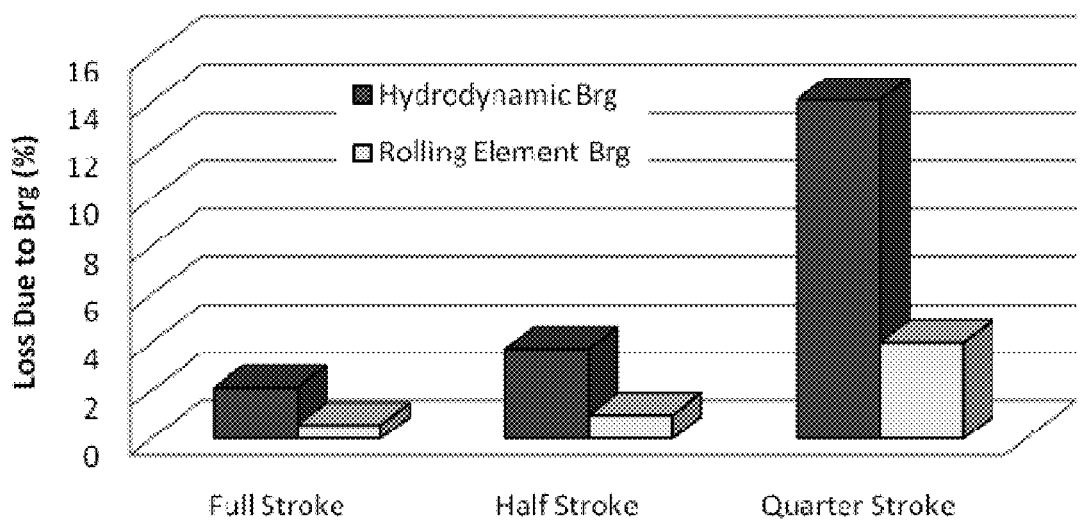
FIG. 11 is a bar chart of frictional losses.

As for all engine configurations employing a driven cam arrangement, friction forces in the wobbler-cradle interface and the main bearings have a significant effect on operation. Hydrodynamic bearings and rolling element bearings are employed in exemplary embodiments as disclosed herein. As shown in FIGS. 10A and 10B, cradle 32 is supported in the wobbler 42 by roller bearings 44a and 44b. Basic calculations as summarized in Table 1 and shown in bar graph form in FIG. 11 demonstrate the relationships between rod force, the resulting bearing force, motive force, and the associated friction force of the bearings as a percentage of total friction.

TABLE 1

|  | Full Stroke | Half Stroke | Quarter Stroke |
|---|---|---|---|
| Hydrodynamic Brg | 2.13 | 3.74 | 14.1 |
| Anti-Friction Brg | 0.55 | 0.96 | 4 |

Figure 12:
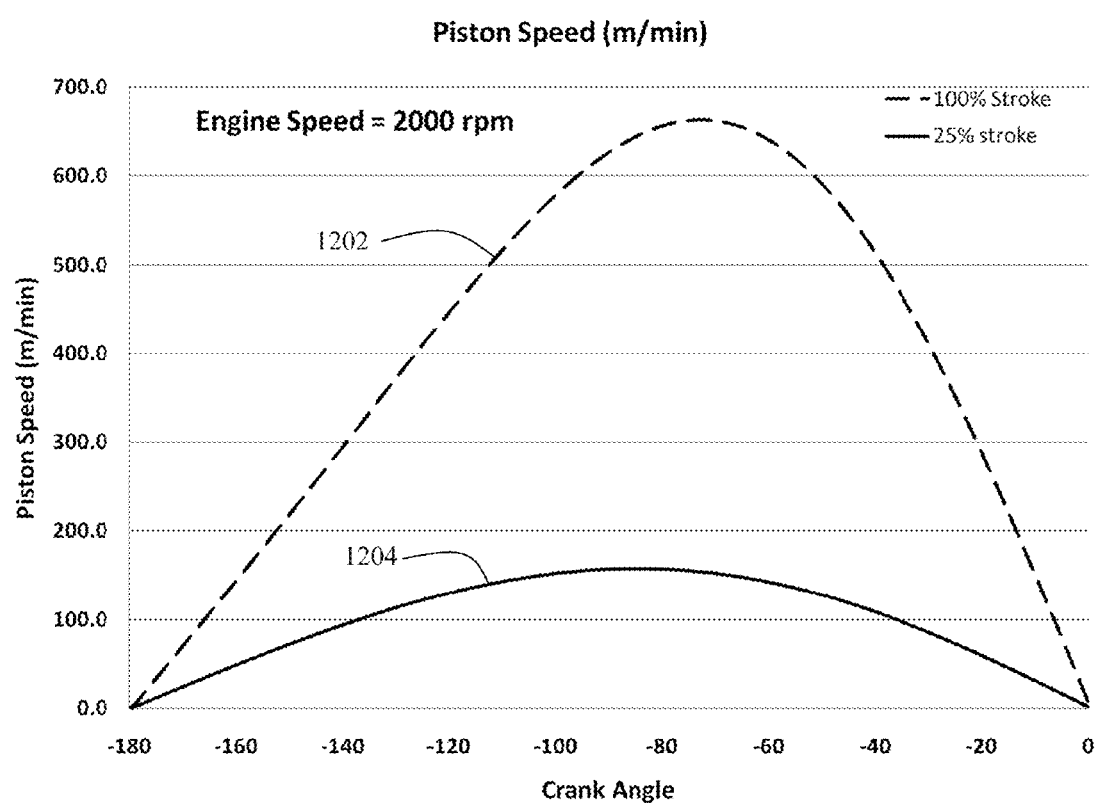
FIG. 12 is a graph of piston speed for two displacement positions in the exemplary embodiment; and, FIG. 13 is a graph of reciprocating friction for the exemplary embodiment.
Figure 13:
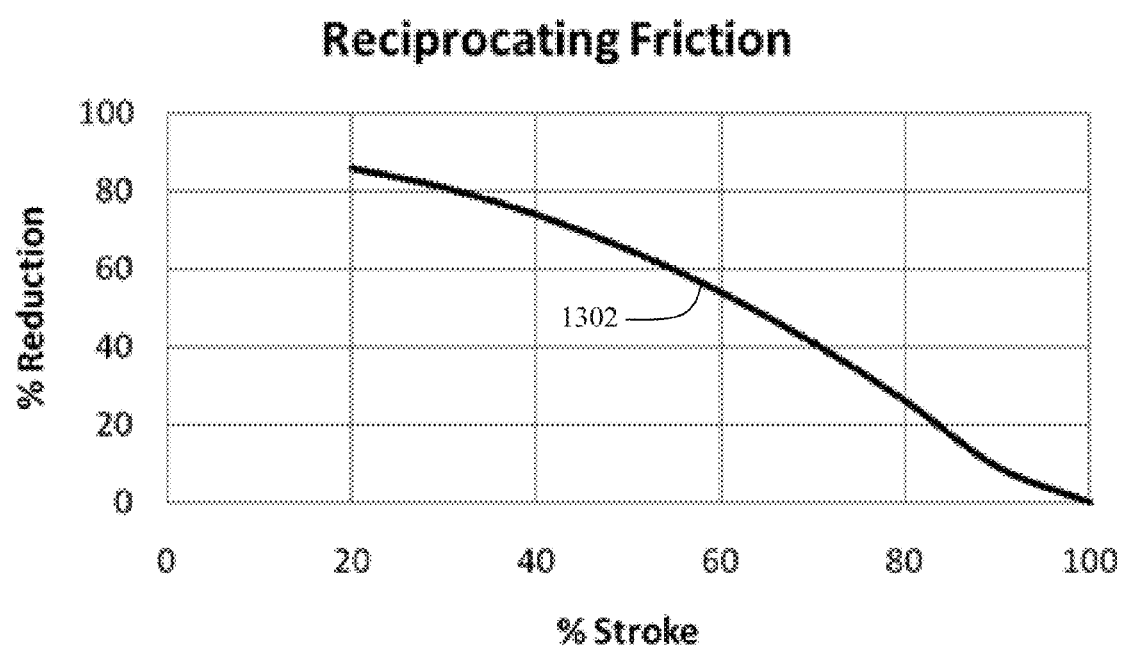

As the stroke of the engine is reduced, the friction forces associated with the wobbler-cradle become large. However, this is only a portion of the friction and is offset with the extreme reduction of reciprocating speed and associated friction allowed by the disclosed embodiments as previously described. The highest engine friction is due to the piston and rings. Friction is a function of $(speed)^2$. At 25% stroke, the piston speed is reduced by a factor of 4 as shown in FIG. 12. At 100% stroke, the piston speed, trace 1202, is significantly higher that at a reduced stroke such as 25% as shown by trace 1204. The resulting piston/ring friction is reduced by a factor of 16. FIG. 13 depicts an actual exemplary system including frication associated with load and providing an overall 85% reduction in friction as shown by trace 1302. Rolling element bearings at the wobbler-cradle as shown in the exemplary embodiments of FIGS. 5A and 5B will maintain a large advantage. Using hydrodynamic bearings will reduce the friction advantage, but it will still be significant for potential use in alternative embodiments.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A variable stroke and compression ratio engine comprising:
    a plurality of pistons connected to a wobbler;
    a crank having an axis of rotation and
       an upper journal with a first angle relative to the axis and
       a lower journal with a second angle with respect to the axis;
    a cradle carried by the crank with sliding engagement to the upper and lower journals for translation thereon between a first high eccentricity position and second low eccentricity position;
    means for anti-rotational connection of the crank to the cradle; and
    means for rotational connection of the wobbler to the cradle.

2. The variable stroke and compression ratio engine as defined in claim 1 wherein the axis of rotation of the crank is substantially parallel to movement of the pistons.

3. The variable stroke and compression ratio engine as defined in claim 1 wherein translation of the cradle on the lower journal induces a reduction in stroke by the wobbler on the pistons from the first position to the second position.

4. The variable stroke and compression ratio engine as defined in claim 3 wherein translation of the cradle on the upper journal induces variation in compression ratio.

5. The variable stroke and compression ratio engine as defined in claim 1 wherein the means for rotational connection of the wobbler to the cradle comprises rolling element bearings.

6. The variable stroke and compression ratio engine as defined in claim 1 further comprising a first split bushing translating on the upper journal and carried in the cradle and a second split bushing translating on the lower journal and carried in the cradle.

7. The variable stroke and compression ratio engine as defined in claim 6 wherein the means for anti-rotational connection of the crank to the cradle comprises the upper and lower journal having a substantially rectangular cross section and the first and second bushings comprising split slider bushings with a cylindrical outer shape and substantially rectangular inner shape to receive the journals.

8. The variable stroke and compression ratio engine as defined in claim 1 wherein the cradle contains a chamber and further comprising a double acting hydraulic circuit with a reacting plate extending from the crank and intermediate the upper and lower journal, the reacting plate separating the chamber into upper and lower chambers wherein introduction of hydraulic pressure in to the upper chamber urges the reacting plate to increase eccentricity of the wobbler on the crank and introduction of hydraulic pressure into the lower chamber urges the reacting plate to reduce eccentricity of the wobbler on the crank.

9. The variable stroke and compression ratio engine as defined in claim 1 further comprising rods for connecting the pistons to the wobbler, said rods connected to a respective piston with a small end ball and socket and connected to the wobbler with a large end ball and socket.

10. The variable stroke and compression ratio engine as defined in claim 1 further comprising means for anti-rotational connection of the wobbler to an engine bedplate.

11. The variable stroke and compression ration engine as defined in claim 10 wherein the means for anti-rotational connection of the wobbler comprises a ball connected to the wobbler and received in a socket in a shoe translating in a slot in the bedplate.

12. A piston control system for a variable stroke and compression ratio engine comprising:
 means for carrying a wobbler on a crank for actuation by a plurality of at least three pistons in a circular pattern;
 means for translating the wobbler relative to a first angle for control of bottom dead center position of the pistons;
 means for simultaneously translating the wobbler relative to a second angle for control of top dead center position of the pistons.

13. The piston control system for a variable stroke and compression ratio engine of claim 12 wherein the means for carrying the wobbler comprises a cradle carried by a crank and the means for translating the wobbler comprises:
 an upper journal on the crank with a first angle relative to an axis of rotation of the crank;
 a lower journal on the crank with a second angle with respect to the axis;
 a first split bushing translating on the upper journal and carried in the cradle and a second split bushing translating on the lower journal and carried in the cradle;
 a double acting hydraulic circuit with a reacting plate extending from the crank and intermediate the upper and lower journal, the reacting plate separating a chamber in the cradle into upper and lower chambers wherein introduction of hydraulic pressure in to the upper chamber urges the reacting plate to increase eccentricity of the wobbler on the crank and introduction of hydraulic pressure into the lower chamber urges the reacting plate to reduce eccentricity of the wobbler on the crank.

14. The piston control system for a variable stroke and compression ratio engine of claim 13 wherein
 the upper and lower journal have a substantially rectangular cross section and the first and second bushings comprising split slider bushings with a cylindrical outer shape and substantially rectangular inner shape to receive the journals.

15. The piston control system for a variable stroke and compression ratio engine of claim 13 further comprising rods for connecting the pistons to the wobbler, said rods connected to a respective piston with a small end ball and socket and connected to the wobbler with a large end ball and socket.

16. The piston control system for a variable stroke and compression ratio engine of claim 13 further comprising a ball connected to the wobbler and received in a socket in a shoe translating in a slot in a bedplate for anti-rotational connection of the wobbler.

17. A method for controlling the output power of an internal combustion engine comprising:
 carrying a wobbler on a crank having an axis of rotation for actuation by a plurality of at least three pistons in a circular pattern;
 translating the wobbler relative to a first angle with respect to the axis of rotation for adjustment of bottom dead center position of the pistons;
 simultaneously translating the wobbler relative to a second angle with respect to the axis of rotation for adjustment of top dead center position of the pistons.

18. The method of claim 17 wherein the wobbler is carried on the crank by a cradle and the crank incorporates an upper journal with a first angle relative to the axis and a lower journal with a second angle with respect to the axis, and wherein
 the step of translating comprises introducing hydraulic pressure into an upper chamber in the cradle, urging a reacting plate extending from the crank to translate the carrier on the first journal and wherein
 the step of simultaneously translating comprises translating the carrier on the second journal,
 the steps of translating and simultaneously translating increasing eccentricity of the wobbler on the crank.

19. The method of claim 18 further comprising introducing hydraulic pressure into the lower chamber urging the reacting plate to reduce eccentricity of the wobbler on the crank.

* * * * *